US008605362B2

(12) United States Patent
Ito

(10) Patent No.: US 8,605,362 B2
(45) Date of Patent: Dec. 10, 2013

(54) ZOOM LENS SYSTEM, OPTICAL APPARATUS AND METHOD FOR MANUFACTURING ZOOM LENS SYSTEM

(75) Inventor: Tomoki Ito, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/033,681

(22) Filed: Feb. 24, 2011

(65) Prior Publication Data

US 2011/0205636 A1 Aug. 25, 2011

(30) Foreign Application Priority Data

Feb. 24, 2010 (JP) ................................. 2010-039196
Aug. 31, 2010 (JP) ................................. 2010-193298
Feb. 3, 2011 (JP) ................................. 2011-021795

(51) Int. Cl.
*G02B 15/14* (2006.01)

(52) U.S. Cl.
USPC ............................................ 359/684; 359/676

(58) Field of Classification Search
USPC .................... 359/676, 680–682, 684
See application file for complete search history.

(56) References Cited

U.S. PATENT DOCUMENTS

| 5,388,004 | A |   | 2/1995  | Adachi          |         |
|-----------|---|---|---------|-----------------|---------|
| 5,760,966 | A |   | 6/1998  | Tanaka et al.   |         |
| 5,847,882 | A |   | 12/1998 | Nakayama        |         |
| 6,010,537 | A | * | 1/2000  | Konno et al.    | 359/389 |
| 6,025,962 | A |   | 2/2000  | Suzuki          |         |
| 6,094,312 | A |   | 7/2000  | Nakayama        |         |
| 6,392,816 | B1|   | 5/2002  | Hamano          |         |
| 6,606,200 | B1|   | 8/2003  | Nakayama et al. |         |
| 7,187,504 | B2|   | 3/2007  | Horiuchi        |         |
| 7,466,500 | B2|   | 12/2008 | Souma et al.    |         |
| 7,468,748 | B2|   | 12/2008 | Iwasawa         |         |
| 8,130,451 | B2|   | 3/2012  | Saito           |         |
| 2004/0218274 | A1 | | 11/2004 | Aoki         |         |
| 2005/0248669 | A1 | | 11/2005 | Iwasawa      |         |
| 2006/0279850 | A1 | | 12/2006 | Horiuchi     |         |
| 2008/0007841 | A1 | | 1/2008  | Souma et al. |         |
| 2011/0032625 | A1 | | 2/2011  | Saito        |         |
| 2011/0228160 | A1 | | 9/2011  | Imaoka et al.|         |
| 2012/0050603 | A1 | | 3/2012  | Imaoka et al.|         |

FOREIGN PATENT DOCUMENTS

| EP | 2 045 637 A2 | 4/2009 |
| EP | 2 075 613 A2 | 7/2009 |
| JP | 61-004013 A  | 1/1986 |
| JP | 5-215967 A   | 8/1993 |

(Continued)

OTHER PUBLICATIONS

Extended European Search Report issued May 19, 2011, in European Patent Application No. 11155682.5.

*Primary Examiner* — James Greece

(74) *Attorney, Agent, or Firm* — Miles & Stockbridge P.C.

(57) ABSTRACT

A zoom lens system includes, in order from an object side: a first lens group having positive refractive power; a second lens group having negative refractive power; a third lens group having positive refractive power; a fourth lens group having negative refractive power; and a fifth lens group having positive refractive power. Upon zooming from a wide-angle end state to a telephoto end state, a position of the first lens group is fixed. At least a portion of any one of the lens groups is moved in a direction including a component perpendicular to an optical axis, and a given conditional expression is satisfied, thereby providing a zoom lens system capable of excellently suppressing variation in aberrations upon zooming and upon correcting an image blur, an optical apparatus including the zoom lens system, and a method for manufacturing the zoom lens system.

25 Claims, 33 Drawing Sheets

(56) References Cited

FOREIGN PATENT DOCUMENTS

| | | |
|---|---|---|
| JP | 06-160712 A | 6/1994 |
| JP | 08-005913 A | 1/1996 |
| JP | 08-146295 A | 6/1996 |
| JP | 08-190051 A | 7/1996 |
| JP | 09-005624 A | 1/1997 |
| JP | 2000-121821 A | 4/2000 |
| JP | 2000-180722 A | 6/2000 |
| JP | 2001-124992 | 5/2001 |
| JP | 2001-124992 A | 5/2001 |
| JP | 2002-162563 A | 6/2002 |
| JP | 2004-117827 A | 4/2004 |
| JP | 2005-321545 A | 11/2005 |
| JP | 2005-352183 A | 12/2005 |
| JP | 2006-178244 A | 6/2006 |
| JP | 2006-227526 | 8/2006 |
| JP | 2006-337745 A | 12/2006 |
| JP | 2007-264395 A | 10/2007 |
| JP | 2008-040485 A | 2/2008 |
| JP | 2009-251280 A | 10/2009 |
| JP | 2011-197472 A | 10/2011 |
| JP | 2012-047814 A | 3/2012 |
| WO | WO 2009/125823 A1 | 10/2009 |
| WO | WO 2010/013435 A1 | 2/2010 |

* cited by examiner

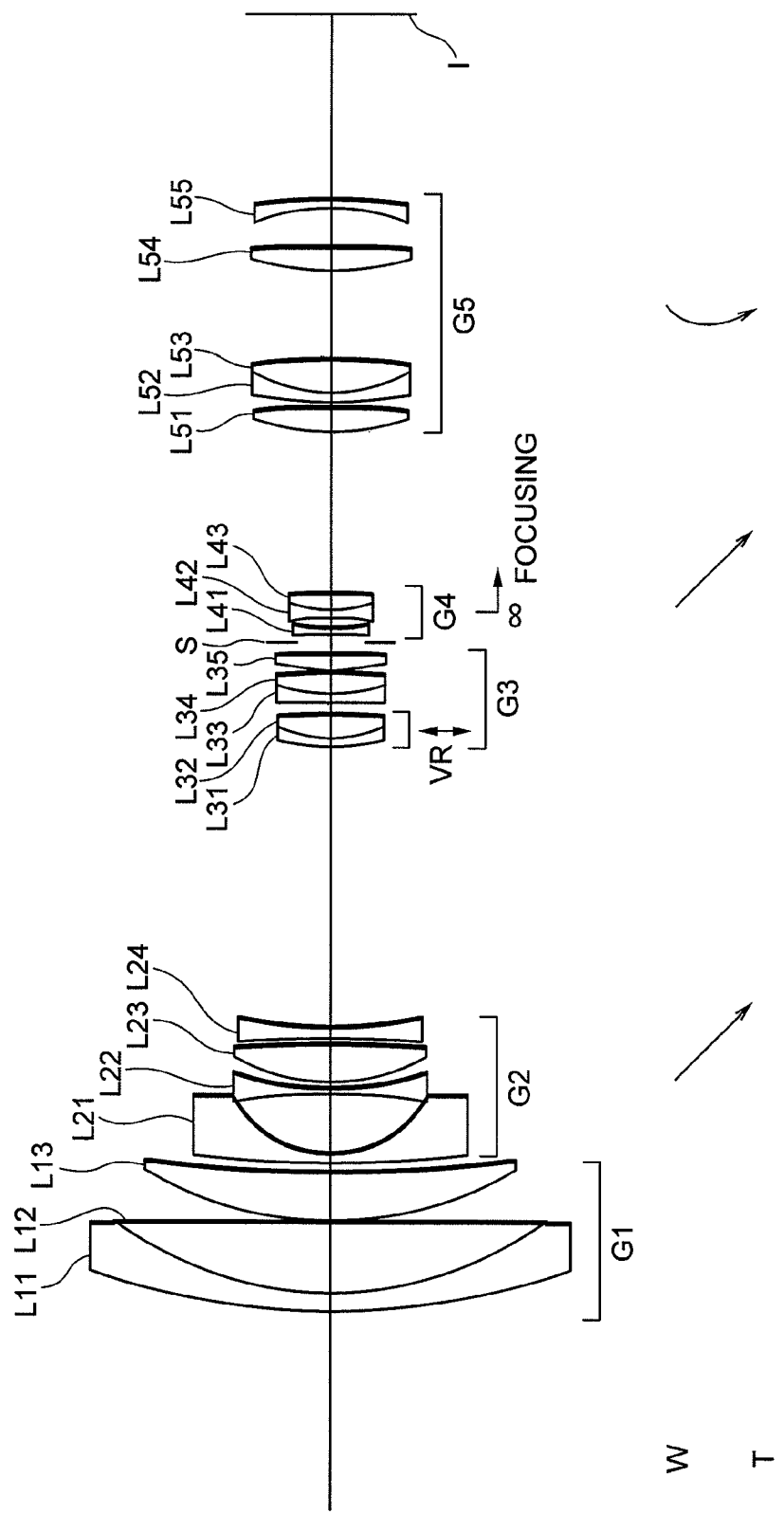

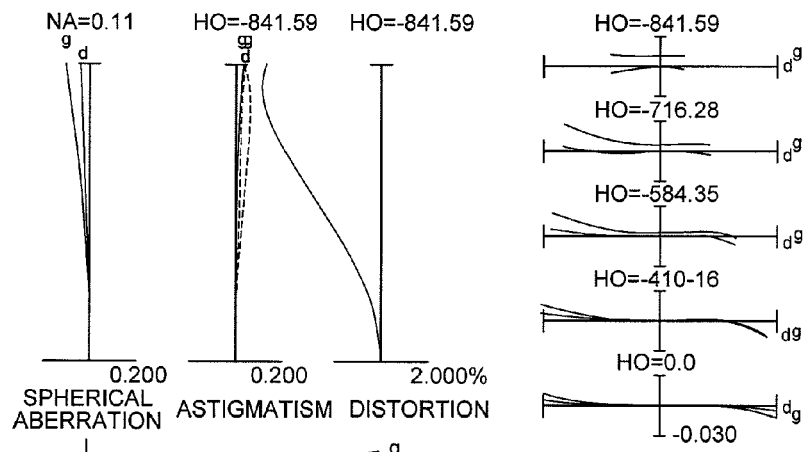
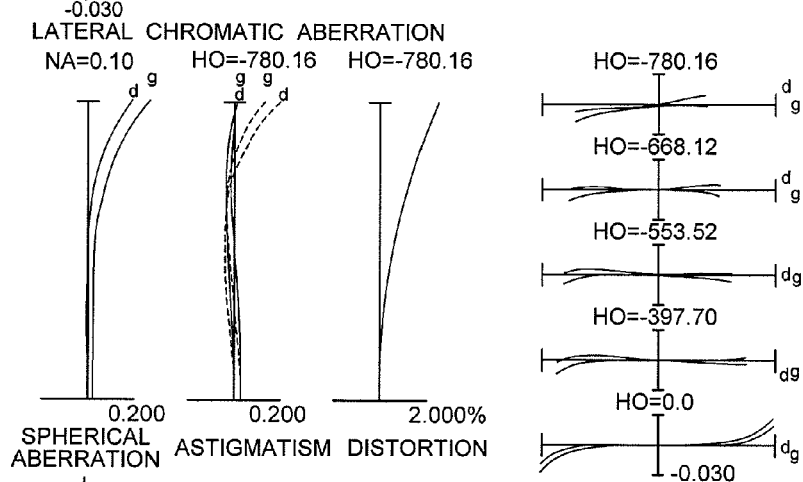
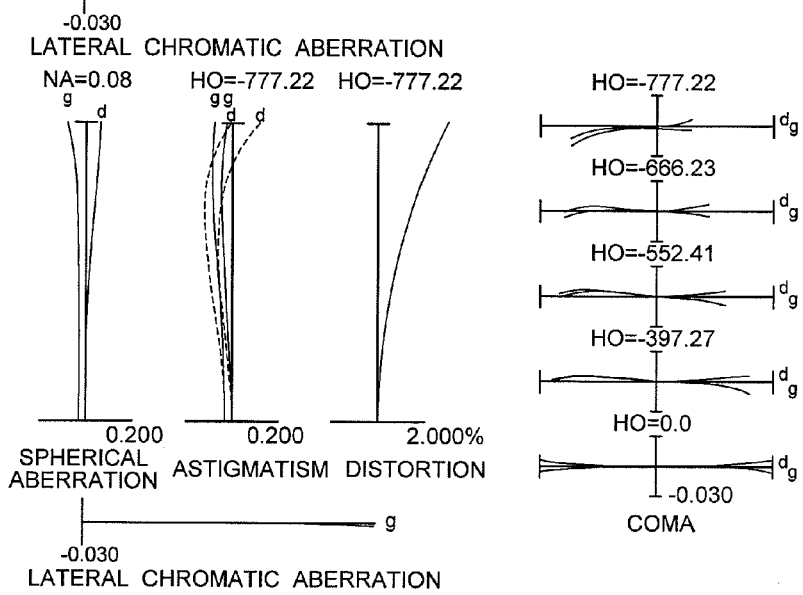
FIG.5A
FIG.5B
FIG.5C

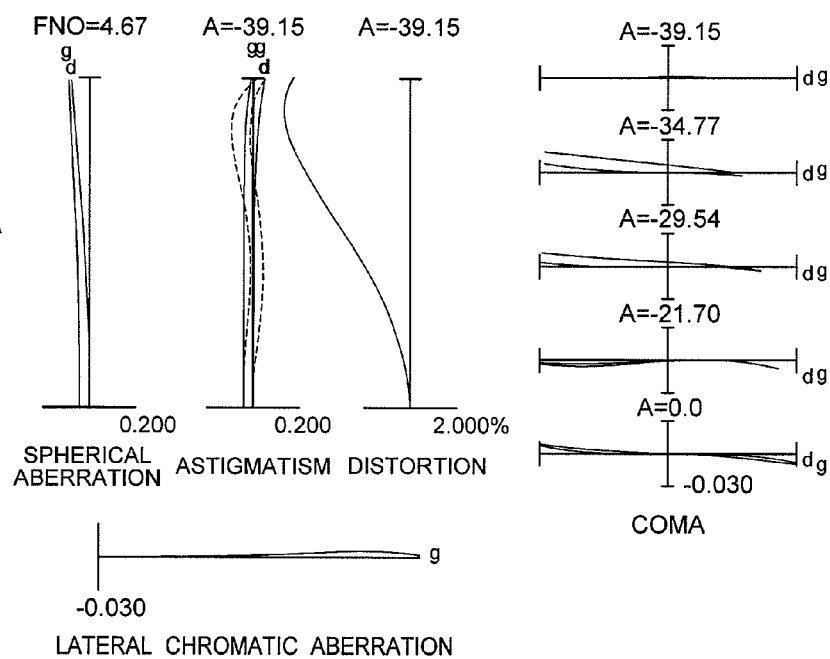
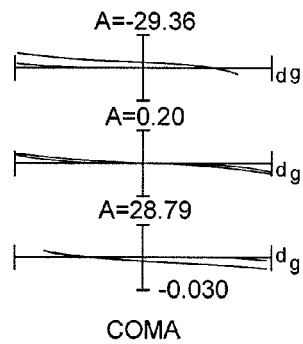

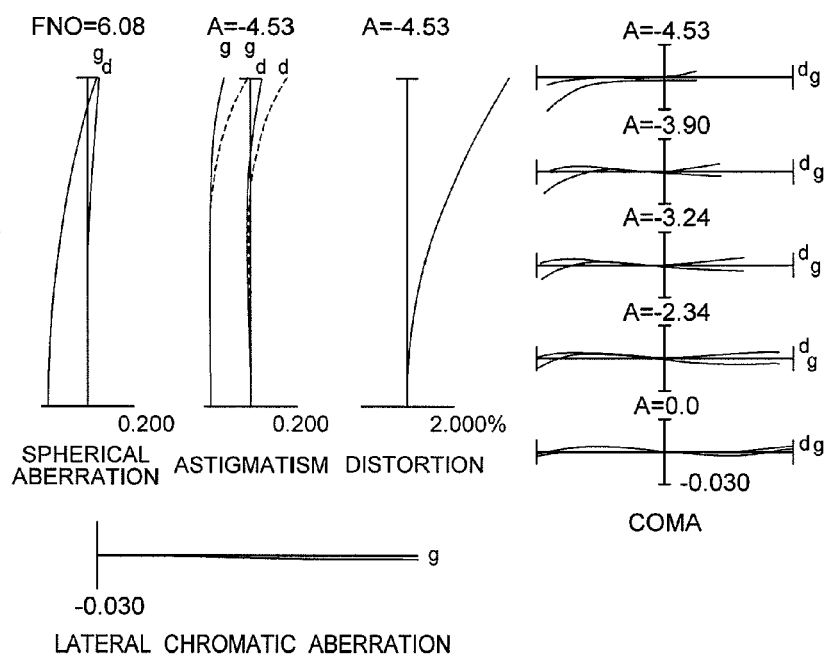
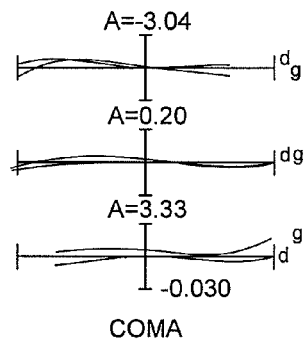

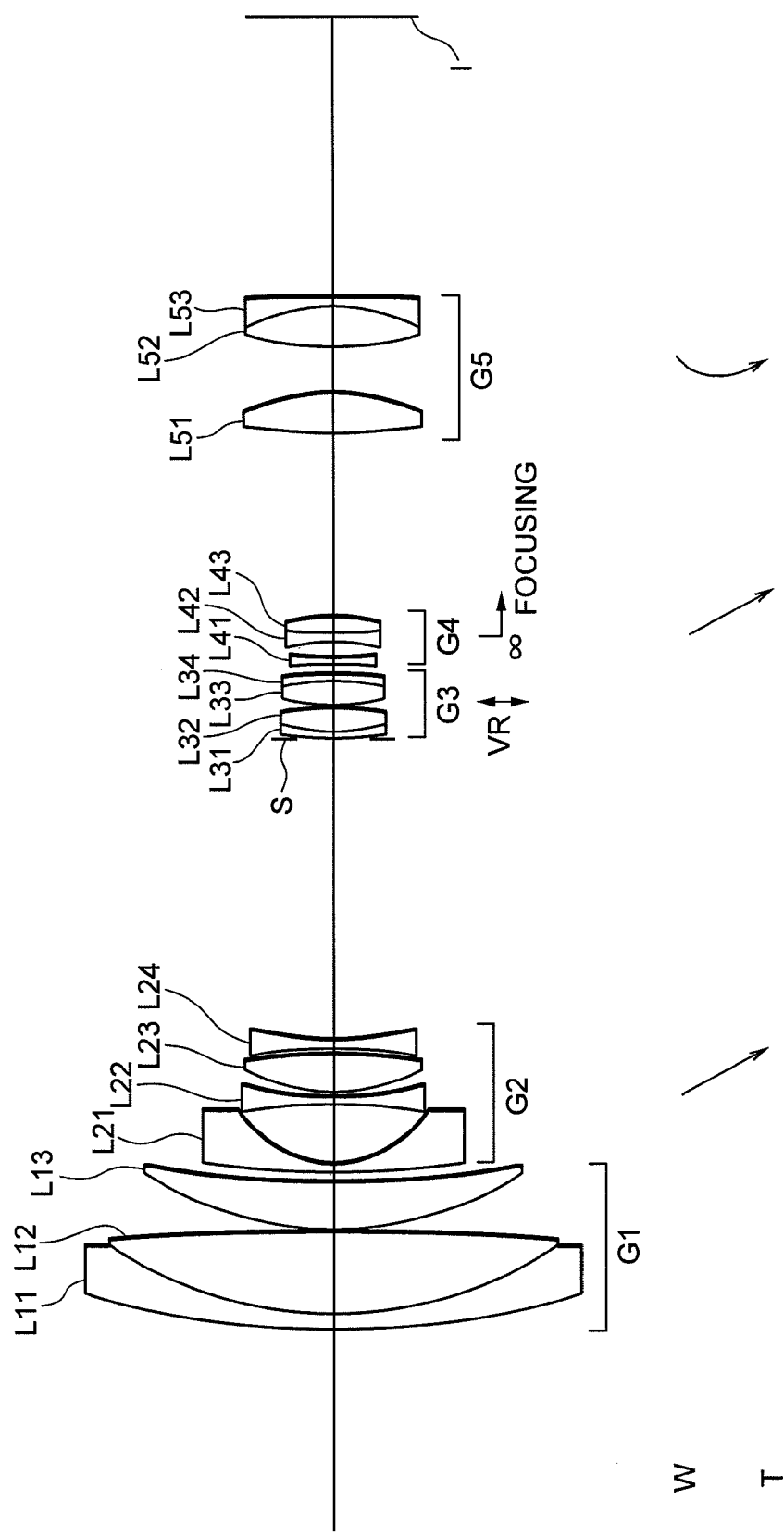

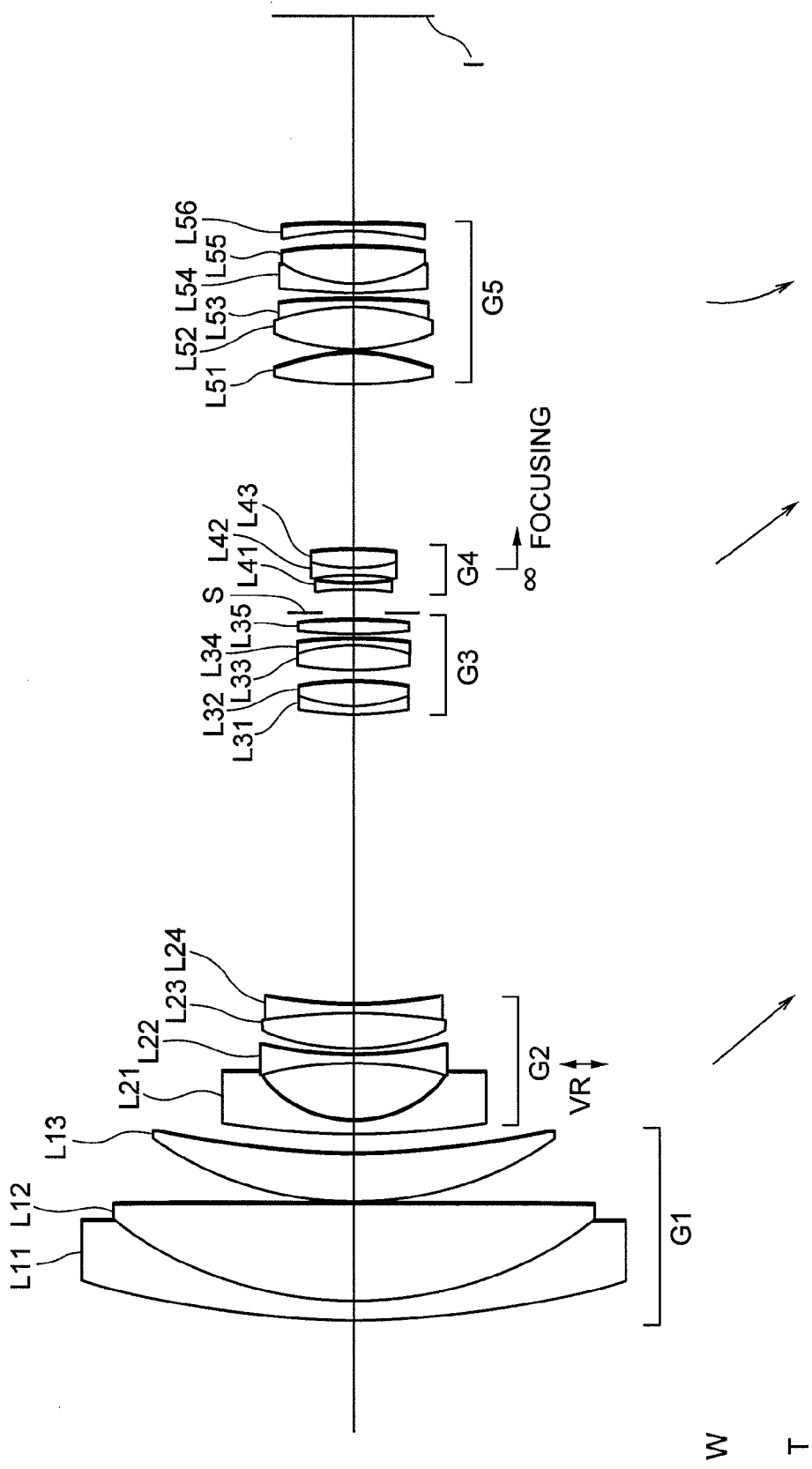

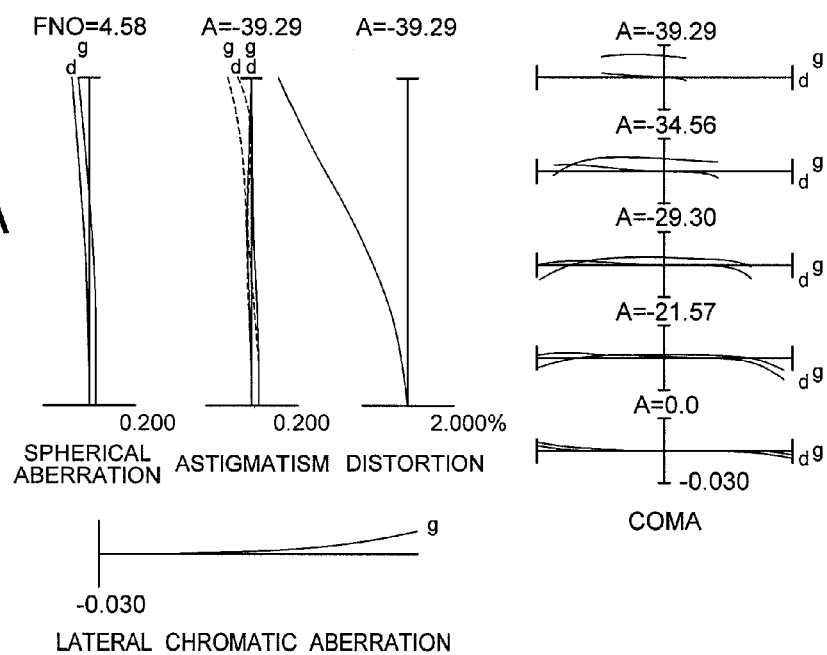
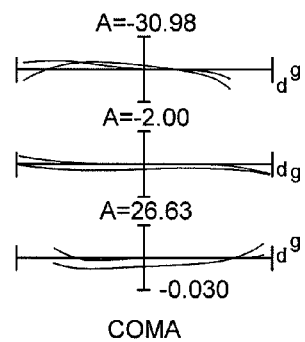

ZOOM LENS SYSTEM, OPTICAL APPARATUS AND METHOD FOR MANUFACTURING ZOOM LENS SYSTEM

The disclosure of the following priority applications are herein incorporated by reference:

Japanese Patent Applications No. 2010-039196 filed on Feb. 24, 2010, No. 2010-193298 filed on Aug. 31, 2010 and No. 2011-021795 filed on Feb. 3, 2011.

BACKGROUND OF THE INVENTION

1. Field of the Invention

The present invention relates to a zoom lens system, an optical apparatus equipped with the zoom lens system, and a method for manufacturing the zoom lens system.

2. Related Background Art

There have been proposed zoom lens systems suitable for a photographic camera, an electronic still camera, video camera, and the like disclosed in such as a Japanese Patent Application Laid-Open No. 2001-124992. However, the conventional zoom lens system has had a problem that variation in aberrations upon zooming or upon correcting an image blur becomes large.

SUMMARY OF THE INVENTION

The present invention is made in view of the above-described problems, and has an object to provide a zoom lens system capable of excellently suppressing variation in aberrations upon zooming and variation in aberrations upon correcting an image blur, an optical apparatus including the zoom lens system, and a method for manufacturing the zoom lens system.

According to a first aspect of the present invention, there is provided a zoom lens system comprising, in order from an object side: a first lens group having positive refractive power; a second lens group having negative refractive power; a third lens group having positive refractive power; a fourth lens group having negative refractive power; and a fifth lens group having positive refractive power, upon zooming from a wide-angle end state to a telephoto end state, a position of the first lens group being fixed, at least a portion of any one of the lens groups being moved in a direction including a component perpendicular to an optical axis, and the following conditional expression (1) being satisfied:

$$5.20 < f1/(-f2) < 8.00 \quad (1)$$

where f1 denotes a focal length of the first lens group, and f2 denotes a focal length of the second lens group.

According to a second aspect of the present invention, there is provided an optical apparatus equipped with the zoom lens system according to the first aspect.

According to a third aspect of the present invention, there is provided a zoom lens system comprising, in order from an object side: a first lens group having positive refractive power; a second lens group having negative refractive power; a third lens group having positive refractive power; a fourth lens group having negative refractive power; and a fifth lens group having positive refractive power, upon zooming from a wide-angle end state to a telephoto end state, a position of the first lens group being fixed, at least a portion of any one of the lens groups being moved in a direction including a component perpendicular to an optical axis, and the following conditional expressions (4) and (5) being satisfied:

$$0.44 < f2/f4 < 1.00 \quad (4)$$

$$0.20 < (-f2)/f5 < 0.50 \quad (5)$$

where f2 denotes a focal length of the second lens group, f4 denotes a focal length of the fourth lens group, and f5 denotes a focal length of the fifth lens group.

According to a fourth aspect of the present invention, there is provided an optical apparatus equipped with the zoom lens system according to the third aspect.

According to a fifth aspect of the present invention, there is provided a method for manufacturing a zoom lens system including, in order from an object side, a first lens group having positive refractive power, a second lens group having negative refractive power, a third lens group having positive refractive power, a fourth lens group having negative refractive power, and a fifth lens group having positive refractive power, the method comprising steps of: disposing the first lens group and the second lens group with satisfying the following conditional expression (1):

$$5.20 < f1/(-f2) < 8.00 \quad (1)$$

where f1 denotes a focal length of the first lens group, and f2 denotes a focal length of the second lens group; fixing the first lens group upon zooming from a wide-angle end state to a telephoto end state; and moving at least a portion of any one of the lens groups in a direction including a component perpendicular to an optical axis.

According to a sixth aspect of the present invention, there is provided a method for manufacturing a zoom lens system including, in order from an object side, a first lens group having positive refractive power, a second lens group having negative refractive power, a third lens group having positive refractive power, a fourth lens group having negative refractive power, and a fifth lens group having positive refractive power, the method comprising steps of: disposing the second lens group, the fourth lens group and the fifth lens group with satisfying the following conditional expressions (4) and (5):

$$0.44 < f2/f4 < 1.00 \quad (4)$$

$$0.20 < (-f2)/f5 < 0.50 \quad (5)$$

where f2 denotes a focal length of the second lens group, f4 denotes a focal length of the fourth lens group, and f5 denotes a focal length of the fifth lens group; fixing the first lens group upon zooming from a wide-angle end state to a telephoto end state; and moving at least a portion of any one of the lens groups in a direction including a component perpendicular to an optical axis.

The present invention makes it possible to provide a zoom lens system capable of excellently suppressing variation in aberrations upon zooming and variation in aberrations upon correcting an image blur, an optical apparatus including the zoom lens system, and a method for manufacturing the zoom lens system.

BRIEF DESCRIPTION OF THE DRAWINGS

FIG. 1 is a sectional view showing a lens configuration of a zoom lens system according to Example 1 of the present application.

FIGS. 2A and 2B are graphs showing various aberrations of the zoom lens system according to Example 1 in a wide-angle end state upon focusing on infinity, in which FIG. 2A shows various aberrations, and FIG. 2B shows coma upon vibration reduction with respect to a rotational camera shake of 0.2 degrees.

FIGS. 3A and 3B are graphs showing various aberrations of the zoom lens system according to Example 1 in an intermediate focal length state upon focusing on infinity, in which FIG. 3A shows various aberrations, and FIG. 3B shows coma upon vibration reduction with respect to a rotational camera shake of 0.2 degrees.

FIGS. 4A and 4B are graphs showing various aberrations of the zoom lens system according to Example 1 in a telephoto end state upon focusing on infinity, in which FIG. 4A shows various aberrations, and FIG. 4B shows coma upon vibration reduction with respect to a rotational camera shake of 0.2 degrees.

FIGS. 5A, 5B and 5C are graphs showing various aberrations of the zoom lens system according to Example 1 upon focusing on a close object, in which FIG. 5A is in the wide-angle end state, FIG. 5B is in the intermediate focal length state, and FIG. 5C is in the telephoto end state.

FIGS. 7A and 7B are graphs showing various aberrations of the zoom lens system according to Example 2 in a wide-angle end state upon focusing on infinity, in which FIG. 7A shows various aberrations, and FIG. 7B shows coma upon vibration reduction with respect to a rotational camera shake of 0.2 degrees.

FIGS. 8A and 8B are graphs showing various aberrations of the zoom lens system according to Example 2 in an intermediate focal length state upon focusing on infinity, in which FIG. 8A shows various aberrations, and FIG. 8B shows coma upon vibration reduction with respect to a rotational camera shake of 0.2 degrees.

FIGS. 9A and 9B are graphs showing various aberrations of the zoom lens system according to Example 2 in a telephoto end state upon focusing on infinity, in which FIG. 9A shows various aberrations, and FIG. 9B shows coma upon vibration reduction with respect to a rotational camera shake of 0.2 degrees.

FIGS. 10A, 10B and 10C are graphs showing various aberrations of the zoom lens system according to Example 2 upon focusing on a close object, in which FIG. 10A is in the wide-angle end state, FIG. 10B is in the intermediate focal length state, and FIG. 10C is in the telephoto end state.

FIG. 11 is a sectional view showing a lens configuration of a zoom lens system according to Example 3 of the present application.

FIGS. 12A and 12B are graphs showing various aberrations of the zoom lens system according to Example 3 in a wide-angle end state upon focusing on infinity, in which FIG. 12A shows various aberrations, and FIG. 12B shows coma upon vibration reduction with respect to a rotational camera shake of 0.2 degrees.

FIGS. 13A and 13B are graphs showing various aberrations of the zoom lens system according to Example 3 in an intermediate focal length state upon focusing on infinity, in which FIG. 13A shows various aberrations, and FIG. 13B shows coma upon vibration reduction with respect to a rotational camera shake of 0.2 degrees.

FIGS. 14A and 14B are graphs showing various aberrations of the zoom lens system according to Example 3 in a telephoto end state upon focusing on infinity, in which FIG. 14A shows various aberrations, and FIG. 14B shows coma upon vibration reduction with respect to a rotational camera shake of 0.2 degrees.

FIGS. 15A, 15B and 15C are graphs showing various aberrations of the zoom lens system according to Example 3 upon focusing on a close object, in which FIG. 15A is in the wide-angle end state, FIG. 15B is in the intermediate focal length state, and FIG. 15C is in the telephoto end state.

FIGS. 17A and 17B are graphs showing various aberrations of the zoom lens system according to Example 4 in a wide-angle end state upon focusing on infinity, in which FIG. 17A shows various aberrations, and FIG. 17B shows coma upon vibration reduction with respect to a rotational camera shake of 0.2 degrees.

FIGS. 18A and 18B are graphs showing various aberrations of the zoom lens system according to Example 4 in an intermediate focal length state upon focusing on infinity, in which FIG. 18A shows various aberrations, and FIG. 18B shows coma upon vibration reduction with respect to a rotational camera shake of 0.2 degrees.

FIGS. 19A and 19B are graphs showing various aberrations of the zoom lens system according to Example 4 in a telephoto end state upon focusing on infinity, in which FIG. 19A shows various aberrations, and FIG. 19B shows coma upon vibration reduction with respect to a rotational camera shake of 0.2 degrees.

FIGS. 20A, 20B and 20C are graphs showing various aberrations of the zoom lens system according to Example 4 upon focusing on a close object, in which FIG. 20A is in the wide-angle end state, FIG. 20B is in the intermediate focal length state, and FIG. 20C is in the telephoto end state.

FIG. 21 is a sectional view showing a lens configuration of a zoom lens system according to Example 5 of the present application.

FIGS. 22A and 22B are graphs showing various aberrations of the zoom lens system according to Example 5 in a wide-angle end state upon focusing on infinity, in which FIG. 22A shows various aberrations, and FIG. 22B shows coma upon vibration reduction with respect to a rotational camera shake of 0.2 degrees.

FIGS. 23A and 23B are graphs showing various aberrations of the zoom lens system according to Example 5 in an intermediate focal length state upon focusing on infinity, in which FIG. 23A shows various aberrations, and FIG. 23B shows coma upon vibration reduction with respect to a rotational camera shake of 0.2 degrees.

FIGS. 24A and 24B are graphs showing various aberrations of the zoom lens system according to Example 5 in a telephoto end state upon focusing on infinity, in which FIG. 24A shows various aberrations, and FIG. 24B shows coma upon vibration reduction with respect to a rotational camera shake of 0.2 degrees.

FIGS. 25A, 25B and 25C are graphs showing various aberrations of the zoom lens system according to Example 5 upon focusing on a close object, in which FIG. 25A is in the wide-angle end state, FIG. 25B is in the intermediate focal length state, and FIG. 25C is in the telephoto end state.

FIGS. 27A and 27B are graphs showing various aberrations of the zoom lens system according to Example 6 in a wide-angle end state upon focusing on infinity, in which FIG. 27A shows various aberrations, and FIG. 27B shows coma upon vibration reduction with respect to a rotational camera shake of 0.2 degrees.

FIGS. 28A and 28B are graphs showing various aberrations of the zoom lens system according to Example 6 in an intermediate focal length state upon focusing on infinity, in which FIG. 28A shows various aberrations, and FIG. 28B shows coma upon vibration reduction with respect to a rotational camera shake of 0.2 degrees.

FIGS. 29A and 29B are graphs showing various aberrations of the zoom lens system according to Example 6 in a telephoto end state upon focusing on infinity, in which FIG. 29A shows various aberrations, and FIG. 29B shows coma upon vibration reduction with respect to a rotational camera shake of 0.2 degrees.

FIGS. 30A, 30B and 30C are graphs showing various aberrations of the zoom lens system according to Example 6 upon focusing on a close object, in which FIG. 30A is in the wide-angle end state, FIG. 30B is in the intermediate focal length state, and FIG. 30C is in the telephoto end state.

DESCRIPTION OF THE MOST PREFERRED EMBODIMENT

Figure 2A:
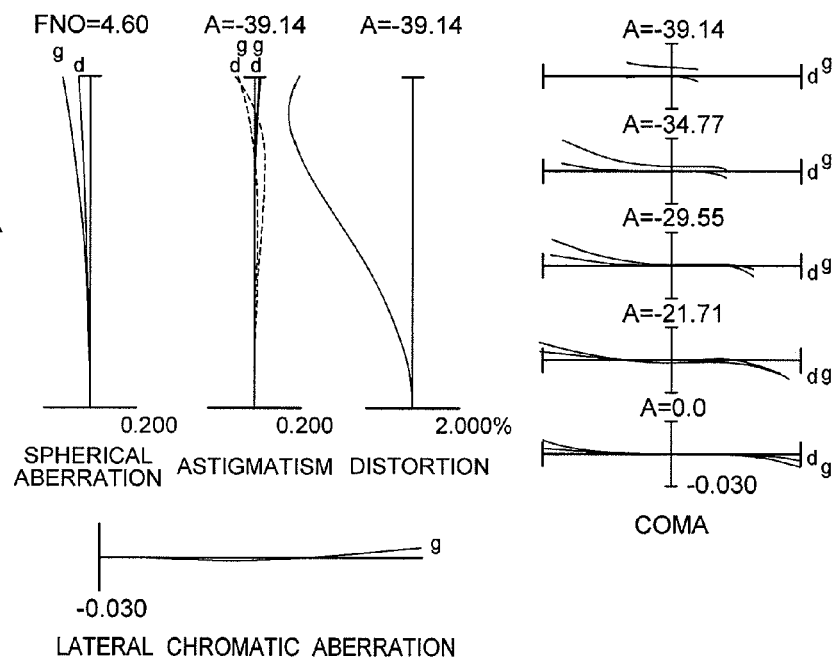

A zoom lens system, an optical apparatus and a method for manufacturing the zoom lens system according to the present application are explained below.

A zoom lens system according to the present application includes, in order from an object side, a first lens group having positive refractive power, a second lens group having negative refractive power, a third lens group having positive refractive power, a fourth lens group having negative refractive power, and a fifth lens group having positive refractive power. Upon zooming from a wide-angle end state to a telephoto end state, a position of the first lens group is fixed. At least a portion of a lens group among the above described lens groups moves in a direction including a component perpendicular to an optical axis. The following conditional expression (1) is satisfied:

$$5.20 < f1/(-f2) < 8.00 \quad (1)$$

where f1 denotes a focal length of the first lens group, and f2 denotes a focal length of the second lens group.

In a zoom lens system according to the present application, with fixing the first lens group, a driving mechanism for zooming can be simplified, so that the lens barrel can be downsized.

Conditional expression (1) defines an appropriate range of a focal length of the first lens group with respect to a focal length of the second lens group. With satisfying conditional expression (1), it becomes possible to excellently correct spherical aberration and lateral chromatic aberration in the telephoto end state and coma and curvature of field in the wide-angle end state.

When the ratio $f1/(-f2)$ is equal to or falls below the lower limit of conditional expression (1), refractive power of the first lens group becomes large, it becomes difficult to correct spherical aberration and lateral chromatic aberration in the telephoto end state. In order to secure the effect of the present application, it is preferable to set the lower limit of conditional expression (1) to 5.30.

On the other hand, when the ratio $f1/(-f2)$ is equal to or exceeds the upper limit of conditional expression (1), refractive power of the second lens group becomes large, so that it becomes difficult to correct coma and curvature of field in the wide-angle end state. In order to secure the effect of the present application, it is preferable to set the upper limit of conditional expression (1) to 6.00.

With configuring in this manner, it becomes possible to realize a zoom lens system capable of excellently suppressing variation in aberrations upon zooming and variation in aberrations upon correcting an image blur.

In a zoom lens system according to the present application, at least a portion of the third lens group is preferably moved in a direction including a component perpendicular to the optical axis. With this configuration, the moving mechanism can be downsized.

In a zoom lens system according to the present application, the following conditional expression (2) is preferably satisfied:

$$0.20 < f3/f5 < 0.80 \quad (2)$$

where f3 denotes a focal length of the third lens group, and f5 denotes a focal length of the fifth lens group.

Conditional expression (2) defines an appropriate range of the focal length of the third lens group with respect to the focal length of the fifth lens group. With satisfying conditional expression (2), a zoom lens system according to the present application makes it possible to excellently correct curvature of field, distortion and spherical aberration.

When the ratio f3/f5 is equal to or falls below the lower limit of conditional expression (2), refractive power of the third lens group becomes large, so that it becomes difficult to correct spherical aberration. In order to secure the effect of the present invention, it is preferable to set the lower limit of conditional expression (2) to 0.40.

On the other hand, when the ratio f3/f5 is equal to or exceeds the upper limit of conditional expression (2), refractive power of the fifth lens group becomes large, so that it becomes difficult to correct curvature of field and distortion. In order to secure the effect of the present application, it is preferable to set the upper limit of conditional expression (2) to 0.70.

In a zoom lens system according to the present application, the fourth lens group is preferably moved upon focusing from an infinity object to a close object. With this configuration, it becomes possible to carry out fast focusing and to make small in variation in spherical aberration and variation in an angle of view upon focusing.

In a zoom lens system according to the present application, the following conditional expression (3) is preferably satisfied:

$$0.20 < (-f4)/f5 < 0.90 \quad (3)$$

where f4 denotes a focal length of the fourth lens group, and f5 denotes a focal length of the fifth lens group.

Conditional expression (3) defines an appropriate range the focal length of the fourth lens group with respect to the focal length of the fifth lens group. With satisfying conditional expression (3), a zoom lens system according to the present application makes it possible to excellently correct curvature of field and distortion with suppressing variation in aberrations upon focusing.

When the ratio $(-f4)/f5$ is equal to or falls below the lower limit of conditional expression (3), refractive power of the fourth lens group becomes large, so that variation in aberrations becomes large. In order to secure the effect of the present application, it is preferable to set the lower limit of conditional expression (3) to 0.40.

On the other hand, when the ratio $(-f4)/f5$ is equal to or exceeds the upper limit of conditional expression (3), refractive power of the fifth lens group becomes large, so that it becomes difficult to correct curvature of field and distortion.

In order to secure the effect of the present application, it is preferable to set the upper limit of conditional expression (3) to 0.80.

In a zoom lens system according to the present application, a position of the third lens group is preferably fixed upon zooming from the wide-angle end state to the telephoto end state. With this configuration, the number of lens groups moving upon zooming can be reduced, so that a driving mechanism for zooming can be simplified. In particular, when at least a portion of the third lens group is moved in a direction having a component perpendicular to an optical axis, since a position of the moving mechanism can be fixed upon zooming, the lens barrel can be downsized.

In a zoom lens system according to the present application, distances between adjacent lens groups are preferably varied upon zooming from the wide-angle end state to the telephoto end state. With this configuration, variation in spherical aberration and variation in curvature of field can be small, so that it is desirable.

In a zoom lens system according to the present application, an aperture stop is preferably disposed between the second lens group and the fourth lens group. With this configuration, it becomes possible to excellently correct coma and curvature of field.

An optical apparatus according to the present application is equipped with a zoom lens system explained above. With this configuration, it becomes possible to realize an optical apparatus capable of excellently suppressing variation in aberrations upon zooming and variation in aberrations upon correcting an image blur.

A method for manufacturing a zoom lens system according to the present application is a method for manufacturing a zoom lens system including, in order from an object, a first lens group having positive refractive power, a second lens group having negative refractive power, a third lens group having positive refractive power, a fourth lens group having negative refractive power, and a fifth lens group having positive refractive power, the method comprising steps of: disposing the first lens group and the second lens group with satisfying the following conditional expression (1) (Step S1); fixing the first lens group upon zooming from a wide-angle end state to a telephoto end state (Step S2); and moving at least a portion of any one of the lens groups in a direction having a component perpendicular to an optical axis (Step S3):

$$5.20 < f1/(-f2) < 8.00 \tag{1}$$

where f1 denotes a focal length of the first lens group, and f2 denotes a focal length of the second lens group.

With the method for manufacturing a zoom lens system according to the present application, it becomes possible to manufacture a zoom lens system capable of excellently suppressing variation in aberrations upon zooming and variation in aberrations upon correcting an image blur.

Then, a zoom lens system, an optical apparatus and a method for manufacturing the zoom lens system seen from another point of view according to the present application are explained below.

A zoom lens system seen from another point of view according to the present application includes, in order from an object side, a first lens group having positive refractive power, a second lens group having negative refractive power, a third lens group having positive refractive power, a fourth lens group having negative refractive power, and a fifth lens group having positive refractive power. Upon zooming from a wide-angle end state to a telephoto end state, a position of the first lens group is fixed. At least a portion of a lens group among the lens groups is moved in a direction including a component perpendicular to an optical axis and the following conditional expressions (4) and (5) are satisfied:

$$0.44 < f2/f4 < 1.00 \tag{4}$$

$$0.20 < (-f2)/f5 < 0.50 \tag{5}$$

where f2 denotes a focal length of the second lens group, f4 denotes a focal length of the fourth lens group, and f5 denotes a focal length of the fifth lens group.

In a zoom lens system seen from another point of view according to the present application, with fixing the position of the first lens group, a driving mechanism for zooming can be simplified, so that the lens barrel can be downsized.

Conditional expression (4) defines an appropriate range of the focal length of the second lens group with respect to the focal length of the fourth lens group. With satisfying conditional expression (4), a zoom lens system seen from another point of view according to the present application makes it possible to excellently correct coma and curvature of field in the wide-angle end state, so that the lens barrel can be prevented from getting larger.

In a zoom lens system seen from another point of view according to the present application, when the ratio f2/f4 is equal to or falls below the lower limit of conditional expression (4), refractive power of the second lens group becomes large, so that it becomes difficult to correct coma and curvature of field in the wide-angle end state. In order to secure the effect of the present application, it is preferable to set the lower limit of conditional expression (4) to 0.50.

On the other hand, when the ratio f2/f4 is equal to or exceeds the upper limit of conditional expression (4), refractive power of the second lens group becomes small, an outer diameter of the first lens group becomes large. As a result, the lens barrel becomes large. In order to secure the effect of the present application, it is preferable to set the upper limit of conditional expression (4) to 0.85.

Conditional expression (5) defines an appropriate range of the focal length of the second lens group with respect to the focal length of the fifth lens group. With satisfying conditional expression (5), a zoom lens system seen from another point of view according to the present application makes it possible to excellently correct curvature of field and distortion, and coma in the wide-angle end state, so that the lens barrel can be prevented from getting larger.

In a zoom lens system seen from another point of view according to the present application, when the ratio (−f2)/f5 is equal to or falls below the lower limit of conditional expression (5), refractive power of the second lens group becomes large, so that it becomes difficult to correct coma and curvature of field in the wide-angle end state. In order to secure the effect of the present application, it is preferable to set the lower limit of conditional expression (5) to 0.25.

On the other hand, when the ratio (−f2)/f5 is equal to or exceeds the upper limit of conditional expression (5), refractive power of the second lens group becomes small, an outer diameter of the first lens group becomes large. Moreover, refractive power of the fifth lens group becomes large, it becomes difficult to correct curvature of field and distortion. In order to secure the effect of the present application, it is preferable to set the upper limit of conditional expression (5) to 0.48.

With constructing in this manner, it becomes possible to realize a zoom lens system capable of suppressing variation in aberrations upon zooming.

In a zoom lens system seen from another point of view according to the present application, the following conditional expression (6) is preferably satisfied:

$$3.00 < f1/f3 < 5.00 \quad (6)$$

where f1 denotes a focal length of the first lens group, and f3 denotes a focal length of the third lens group.

Conditional expression (6) defines an appropriate range of the focal length of the first lens group with respect to the focal length of the third lens group. With satisfying conditional expression (6), a zoom lens system seen from another point of view according to the present application makes it possible to excellently correct spherical aberration, and lateral chromatic aberration in the telephoto end state.

In a zoom lens system seen from another point of view according to the present application, when the ratio f1/f3 is equal to or falls below the lower limit of conditional expression (6), refractive power of the first lens group becomes large, so that it becomes difficult to correct spherical aberration and lateral chromatic aberration in the telephoto end state. In order to secure the effect of the present application, it is preferable to set the lower limit of conditional expression (6) to 3.20.

On the other hand, when the ratio f1/f3 is equal to or exceeds the upper limit of conditional expression (6), refractive power of the third lens group becomes large, so that it becomes difficult to correct spherical aberration. In order to secure the effect of the present application, it is preferable to set the upper limit of conditional expression (6) to 4.50.

In a zoom lens system seen from another point of view according to the present application, the following conditional expression (7) is preferably satisfied:

$$2.00 < f1/(-f4) < 5.00 \quad (7)$$

where f1 denotes a focal length of the first lens group, and f4 denotes a focal length of the fourth lens group.

Conditional expression (7) defines an appropriate range of the focal length of the first lens group with respect to the focal length of the fourth lens group. With satisfying conditional expression (7), a zoom lens system seen from another point of view according to the present application makes it possible to excellently correct curvature of field, astigmatism, and spherical aberration and lateral chromatic aberration in the telephoto end state, so that the lens barrel can be prevented from getting larger.

In a zoom lens system seen from another point of view according to the present application, when the ratio f1/(−f4) is equal to or falls below the lower limit of conditional expression (7), refractive power of the first lens group becomes large, so that it becomes difficult to correct spherical aberration and lateral chromatic aberration in the telephoto end state. In order to secure the effect of the present application, it is preferable to set the lower limit of conditional expression (7) to 2.40.

On the other hand, when the ratio f1/(−f4) is equal to or exceeds the upper limit of conditional expression (7), refractive power of the fourth lens group becomes large, so that it becomes difficult to correct curvature of field and astigmatism. In order to secure the effect of the present application, it is preferable to set the upper limit of conditional expression (7) to 4.80.

In a zoom lens system seen from another point of view according to the present application, upon focusing from an infinity object to a close object, the fourth lens group is preferably moved. With this configuration, it becomes possible to carry out fast focusing and to make smaller the variations in the angle of view and spherical aberration upon focusing.

In a zoom lens system seen from another point of view according to the present application, upon zooming from the wide-angle end state to the telephoto end state, the position of the third lens group is preferably fixed. With this configuration, it becomes possible to reduce the number of moving lens groups upon zooming, so that the driving mechanism for zooming can be simplified. In particular, when at least a portion of the third lens group is moved in a direction including a component perpendicular to the optical axis, since the position of the moving mechanism can be fixed upon zooming, the lens barrel can be downsized.

In a zoom lens system seen from another point of view according to the present application, at least a portion of the third lens group is preferably moved in a direction including a component perpendicular to the optical axis. With this configuration, it becomes possible to downsize the moving mechanism.

In a zoom lens system seen from another point of view according to the present application, distances between adjacent lens groups are preferably varied upon zooming from the wide-angle end state to the telephoto end state. With this configuration, variation in spherical aberration and variation in curvature of field can be small, so that it is desirable.

In a zoom lens system seen from another point of view according to the present application, an aperture stop is preferably disposed between the second lens group and the fourth lens group. With this configuration, it becomes possible to excellently correct coma and curvature of field.

An optical apparatus according to the present application is equipped with a zoom lens system seen from another point of view explained above. With this configuration, it becomes possible to realize an optical apparatus capable of excellently suppressing variation in aberrations upon zooming.

Then, a method for manufacturing a zoom lens system seen from another point of view according to the present application is a method for manufacturing a zoom lens system including, in order from an object, a first lens group having positive refractive power, a second lens group having negative refractive power, a third lens group having positive refractive power, a fourth lens group having negative refractive power, and a fifth lens group having positive refractive power, the method comprising steps of: disposing the second lens group, the fourth lens group and the fifth lens group with satisfying conditional expressions (4) and (5) (Step S11); disposing the first lens group with fixing upon zooming from the wide-angle end state to the telephoto end state (Step S12); and moving at least a portion of any one of the lens groups in a direction including a component perpendicular to the optical axis (Step S13):

$$0.44 < f2/f4 < 1.00 \quad (4)$$

$$0.20 < (-f2)/f5 < 0.50 \quad (5)$$

where f2 denotes a focal length of the second lens group, f4 denotes a focal length of the fourth lens group, and f5 denotes a focal length of the fifth lens group.

With the method for manufacturing a zoom lens system seen from another point of view according to the present application, it becomes possible to manufacture a zoom lens system capable of excellently suppressing variation in aberrations upon zooming.

Each numerical example of a zoom lens system according to the present application is explained below with reference to accompanying drawings.

Example 1

FIG. 1 is a sectional view showing a lens configuration of a zoom lens system according to Example 1 of the present application.

The zoom lens system according to Example 1 of the present application is composed of, in order from an object side, a first lens group G1 having positive refractive power, a second lens group G2 having negative refractive power, a third lens group G3 having positive refractive power, an aperture stop S, a fourth lens group G4 having negative refractive power, and a fifth lens group G5 having positive refractive power.

The first lens group G1 is composed of, in order from the object side, a cemented positive lens constructed by a negative meniscus lens L11 having a convex surface facing the object side cemented with a positive meniscus lens L12 having a convex surface facing the object side, and a positive meniscus lens L13 having a convex surface facing the object side.

The second lens group G2 is composed of, in order from the object side, a negative meniscus lens L21 having a convex surface facing the object side, a double concave negative lens L22, a double convex positive lens L23, and a double concave negative lens L24.

The third lens group G3 is composed of, in order from the object side, a cemented positive lens constructed by a negative meniscus lens L31 having a convex surface facing the object side cemented with a double convex positive lens L32, a cemented negative lens constructed by a negative meniscus lens L33 having a convex surface facing the object side cemented with a double convex positive lens L34, and a double convex positive lens L35.

The fourth lens group G4 is composed of, in order from the object side, a double concave negative lens L41 and a cemented negative lens constructed by a double concave negative lens L42 cemented with a double convex positive lens L43.

The fifth lens group G5 is composed of, in order from the object side, a double convex positive lens L51, a cemented positive lens constructed by a negative meniscus lens L52 having a convex surface facing the object side cemented with a double convex positive lens L53, a double convex positive lens L54, and a negative meniscus lens L55 having a concave surface facing the object side.

In the zoom lens system according to Example 1, upon zooming from a wide-angle end state and a telephoto end state, the second lens group G2, the fourth lens group G4 and the fifth lens group G5 are moved along an optical axis such that a distance between the first lens group G1 and the second lens group G2 varies, a distance between the second lens group G2 and the third lens group G3 varies, a distance between the third lens group G3 and the fourth lens group G4 varies, and a distance between the fourth lens group G4 and the fifth lens group G5 varies. In this instance, positions of the first lens group G1, the thirds lens group G3 and the aperture stop S are fixed.

In the zoom lens system according to Example 1, the cemented positive lens constructed by the negative meniscus lens L31 cemented with the positive lens L32 in the third lens group G3 moves as a vibration reduction lens group in a direction including a component perpendicular to the optical axis, thereby correcting an image blur.

In the zoom lens system according to Example 1, the whole of the fourth lens group G4 is moved to the image side, thereby carrying out focusing from an infinity object to a close object.

Various values associated with the zoom lens system according to Example 1 are listed in Table 1.

In (Specifications), f denotes a focal length, FNO denotes an f-number, 2ω denotes an angle of view, Y denotes an image height, TL denotes a total lens length, and BF denotes a back focal length.

In (Lens Data), the left most column "i" shows a lens surface number counted in order from the object side, the second column "r" shows a radius of curvature of the lens surface, the third column "d" shows a distance to the next lens surface, the fourth column "nd" shows a refractive index at d-line (wavelength λ=587.6 nm), and the fifth column "νd" shows an Abbe number at d-line (wavelength λ=587.6 nm). In the fourth column "nd" refractive index of the air nd=1.000000 is omitted. In the second column "r", r=∞ indicates a plane surface.

In (Aspherical Surface Date), an aspherical surface is expressed by the following expression:

$$x=(h^2/r)/[1+[1-K(h^2/r^2)]^{1/2}]+A4\times h^4+A6\times h^6+A8\times h^8+A10\times h^{10}+A12\times h^{12}+A14\times h^{14}$$

where h denotes a vertical height from the optical axis, x denotes a sag amount which is a distance along the optical axis from the tangent surface at the vertex of the aspherical surface to the aspherical surface at the vertical height h from the optical axis, r denotes a radius of curvature of a reference sphere (paraxial radius of curvature), κ denotes a conical coefficient, and An denotes an aspherical coefficient of n-th order. In (Aspherical Surface Data), "E-n" denotes "×10$^{-n}$", in which "n" is an integer, and for example "1.234E-05" denotes "1.234×10$^{-5}$". Each aspherical surface is expressed in (Lens Data) by attaching "*" to the left side of the surface number.

In (Variable Distances), di ("i" is an integer) denotes a variable distance of an "i-th" surface. "W" denotes a wide-angle end state, "M" denotes an intermediate focal length state, and "T" denotes a telephoto end state.

In (Lens Group Data), a starting surface number "I" and a focal length of each lens group is shown.

In (Values for Conditional Expressions), values for conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

In a lens system having a focal length of f, and a vibration coefficient (a ratio of a moving amount of an image on the image plane to a moving amount of a vibration reduction lens group) of K, in order to correct a rotational camera shake of θ degree, the vibration reduction lens group is to be moved a moving amount of (f·tan θ)/K. Accordingly, in Example 1, in the wide-angle end state, the vibration reduction coefficient is 0.86, the focal length is 10.3 mm, so that in order to correct a rotational camera shake of 0.2 degrees, the moving amount of the vibration reduction lens group is 0.04 mm. In an intermediate focal length state, the vibration reduction coefficient is 1.23, the focal length is 45.0 mm, so that in order to correct a rotational camera shake of 0.2 degrees, the moving amount of the vibration reduction lens group is 0.13 mm. In the telephoto end state, the vibration reduction coefficient is 1.42, the focal length is 97.0 mm, so that in order to correct a rotational camera shake of 0.2 degrees, the moving amount of the vibration reduction lens group is 0.24 mm.

TABLE 1

(Specifications)
Zoom Ratio: 9.42

|  | W | M | T |
|---|---|---|---|
| f = | 10.3 | 45.0 | 97.0 |
| FNO = | 4.6 | 5.1 | 5.9 |
| 2ω = | 78.3 | 19.6 | 9.2 |
| Y = | 8.0 | 8.0 | 8.0 |
| TL = | 128.784 | 128.784 | 128.784 |
| Bf = | 18.391 | 18.023 | 15.384 |

(Lens Data)

| i | r | d | nd | νd |
|---|---|---|---|---|
| 1 | 74.1356 | 1.800 | 1.850260 | 32.35 |
| 2 | 36.0351 | 7.000 | 1.497820 | 82.51 |
| 3 | 3038.1597 | 0.100 | | |
| 4 | 36.3362 | 5.000 | 1.729157 | 54.66 |
| 5 | 170.0064 | (d5) | | |
| *6 | 159.7676 | 1.000 | 1.816000 | 46.62 |
| 7 | 11.1111 | 5.757 | | |
| 8 | −57.3031 | 0.800 | 1.816000 | 46.62 |
| 9 | 32.0791 | 0.202 | | |
| 10 | 18.8298 | 4.000 | 1.846660 | 23.78 |
| 11 | −127.9381 | 0.317 | | |
| 12 | −90.0599 | 1.000 | 1.816000 | 46.62 |
| 13 | 41.7316 | (d13) | | |
| 14 | 22.5107 | 0.800 | 1.834000 | 37.16 |
| 15 | 12.0861 | 2.500 | 1.603001 | 65.46 |
| 16 | −69.1710 | 1.000 | | |
| 17 | 864.1596 | 1.000 | 1.850260 | 32.35 |
| 18 | 16.8557 | 2.200 | 1.603001 | 65.46 |
| 19 | −47.4738 | 0.100 | | |
| 20 | 24.2921 | 1.800 | 1.729157 | 54.66 |
| 21 | −67.1681 | 1.000 | | |
| 22 | ∞ | (d22) | Aperture Stop S | |
| 23 | −43.6868 | 0.800 | 1.834807 | 42.72 |
| 24 | 22.6901 | 0.800 | | |
| 25 | −25.0831 | 0.800 | 1.834807 | 42.72 |
| 26 | 11.7100 | 1.800 | 1.846660 | 23.78 |
| 27 | −48.7106 | (d27) | | |
| 28 | 24.1884 | 2.500 | 1.497820 | 82.51 |
| 29 | −58.4609 | 0.200 | | |
| 30 | 40.9485 | 1.000 | 1.834807 | 42.72 |
| 31 | 15.4156 | 3.500 | 1.497820 | 82.51 |
| 32 | −46.0872 | 8.564 | | |
| 33 | 28.3973 | 2.500 | 1.497820 | 82.51 |
| 34 | −123.1319 | 3.765 | | |
| 35 | −20.5259 | 1.000 | 1.846660 | 23.78 |
| 36 | −54.7499 | BF | | |

(Aspherical Surface Data)

Surface Number: 6
κ = −20.0000
A4 = 4.26826E−06
A6 = −9.97395E−09
A8 = 1.52813E−11
A10 = −3.70867E−14

(Variable Distances upon Zooming)

|  | W | M | T |
|---|---|---|---|
| upon focusing on an infinity object | | | |
| d5 = | 0.800 | 20.355 | 28.029 |
| d13 = | 28.052 | 8.497 | 0.823 |
| d22 = | 0.800 | 8.210 | 13.112 |
| d27 = | 16.136 | 9.093 | 6.831 |
| BF = | 18.391 | 18.023 | 15.384 |
| upon focusing on a close object | | | |
| d5 = | 0.800 | 20.355 | 28.029 |
| d13 = | 28.052 | 8.497 | 0.823 |
| d22 = | 0.855 | 8.379 | 13.439 |

TABLE 1-continued

| d27 = | 16.081 | 8.924 | 6.503 |
| BF = | 18.391 | 18.023 | 15.384 |

(Lens Group Data)

| Group | I | Focal Length |
|---|---|---|
| 1 | 1 | 57.577 |
| 2 | 6 | −10.550 |
| 3 | 14 | 16.309 |
| 4 | 23 | −14.362 |
| 5 | 28 | 24.289 |

(Values for Conditional Expressions)

(1) f1/(−f2) = 5.46
(2) f3/f5 = 0.67
(3) (−f4)/f5 = 0.59
(4) f2/f4 = 0.73
(5) (−f2)/f5 = 0.43
(6) f1/f3 = 3.53
(7) f1/(−f4) = 4.01

Figure 2B:
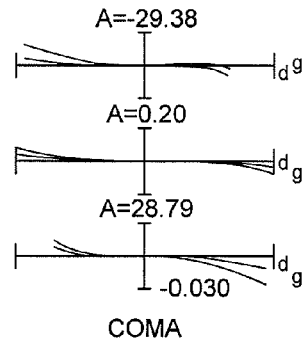

FIGS. 2A and 2B are graphs showing various aberrations of the zoom lens system according to Example 1 in a wide-angle end state upon focusing on infinity, in which FIG. 2A shows various aberrations, and FIG. 2B shows coma upon vibration reduction with respect to a rotational camera shake of 0.2 degrees.

Figure 3A:
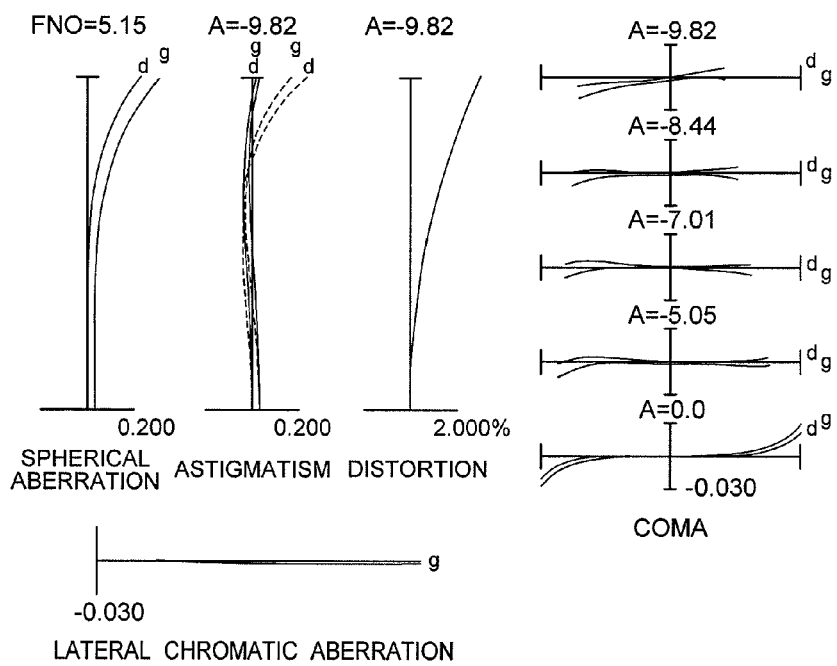
Figure 3B:
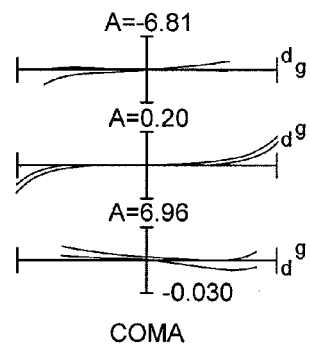

FIGS. 3A and 3B are graphs showing various aberrations of the zoom lens system according to Example 1 in an intermediate focal length state upon focusing on infinity, in which FIG. 3A shows various aberrations, and FIG. 3B shows coma upon vibration reduction with respect to a rotational camera shake of 0.2 degrees.

Figure 4A:
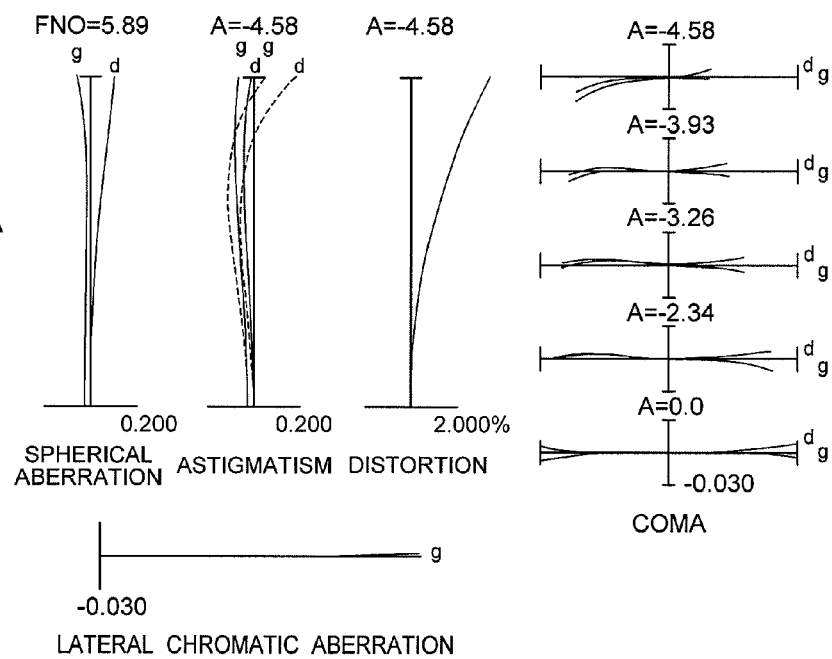
Figure 4B:
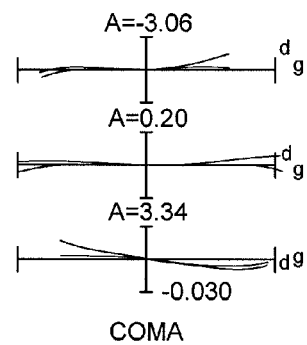

FIGS. 4A and 4B are graphs showing various aberrations of the zoom lens system according to Example 1 in a telephoto end state upon focusing on infinity, in which FIG. 4A shows various aberrations, and FIG. 4B shows coma upon vibration reduction with respect to a rotational camera shake of 0.2 degrees.

FIGS. 5A, 5B and 5C are graphs showing various aberrations of the zoom lens system according to Example 1 upon focusing on a close object, in which FIG. 5A is in the wide-angle end state, FIG. 5B is in the intermediate focal length state, and FIG. 5C is in the telephoto end state.

In respective graphs, FNO denotes an f-number, A denotes a half angle of view (unit: degree), and H0 denotes an object height (unit: mm). In respective graphs showing spherical aberration, an f-number with respect to the maximum aperture is shown. In respective graphs showing astigmatism and distortion, the maximum value of a half angle of view or an image height is shown. In respective graphs showing coma, coma with respect to a half angle of view or each object height is shown. In respective graphs, d denotes d-line (wavelength λ=587.6 nm), and g denotes g-line (wavelength λ=435.8 nm). In graphs showing astigmatism, a solid line indicates a sagittal image plane, and a broken line indicates a meridional image plane. The above-described explanation regarding various aberration graphs is the same as the other Examples.

As is apparent from the respective graphs, the zoom lens system according to Example 1 shows superb optical performance as a result of good corrections to various aberrations in each focal length state from the wide-angle end state through the telephoto end state even upon carrying out vibration reduction.

Example 2

Figure 6:
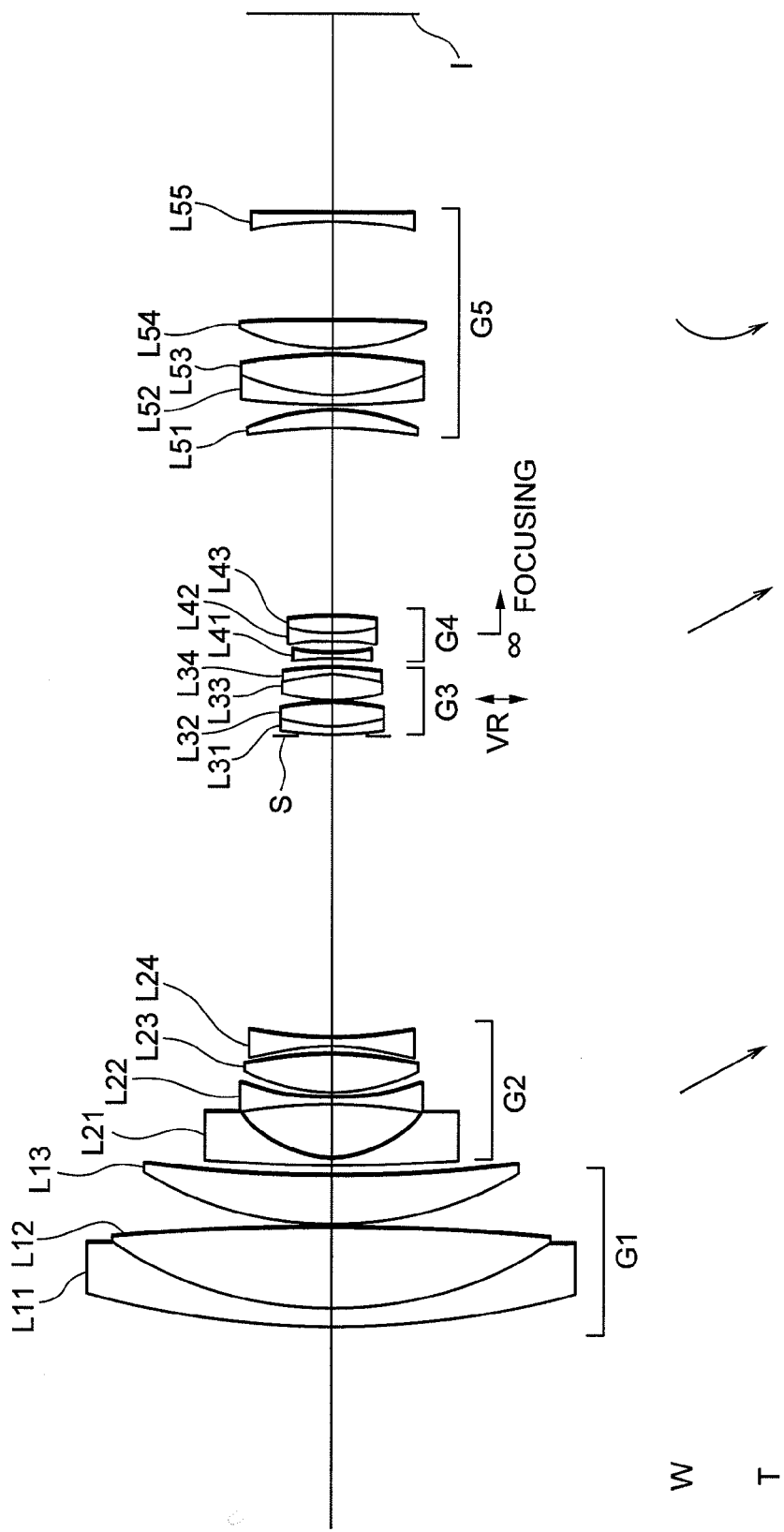
FIG. 6 is a sectional view showing a lens configuration of a zoom lens system according to Example 2 of the present application.

FIG. 6 is a sectional view showing a lens configuration of a zoom lens system according to Example 2 of the present application.

The zoom lens system according to Example 2 is composed of, in order from an object side, a first lens group G1 having positive refractive power, a second lens group G2 having negative refractive power, an aperture stop S, a third lens group G3 having positive refractive power, a fourth lens group G4 having negative refractive power, and a fifth lens group G5 having positive refractive power.

The first lens group G1 is composed of, in order from the object side, a cemented positive lens constructed by a negative meniscus lens L11 having a convex surface facing the object side cemented with a double convex positive lens L12, and a positive meniscus lens L13 having a convex surface facing the object side.

The second lens group G2 is composed of, in order from the object side, a negative meniscus lens L21 having a convex surface facing the object side, a double concave negative lens L22, a double convex positive lens L23, and a double concave negative lens L24.

The third lens group G3 is composed of, in order from the object side, a cemented positive lens constructed by a negative meniscus lens L31 having a convex surface facing the object side cemented with a double convex positive lens L32, and a cemented positive lens constructed by a double convex positive lens L33 cemented with a negative meniscus lens L34 having a concave surface facing the object side.

The fourth lens group G4 is composed of, in order from the object side, a double concave negative lens L41, and a cemented negative lens constructed by a double concave negative lens L42 cemented with a double convex positive lens L43.

The fifth lens group G5 is composed of, in order from the object side, a positive meniscus lens L51 having a concave surface facing the object side, a cemented positive lens constructed by a negative meniscus lens L52 having a convex surface facing the object side cemented with a double convex positive lens L53, a double convex positive lens L54, and a negative meniscus lens L55 having a concave surface facing the object side.

In the zoom lens system according to Example 2, upon zooming from a wide-angle end state to a telephoto end state, the second lens group G2, the fourth lens group G4 and the fifth lens group G5 are moved along an optical axis such that a distance between the first lens group G1 and the second lens group G2 varies, a distance between the second lens group G2 and the third lens group G3 varies, a distance between the third lens group G3 and the fourth lens group G4 varies, and a distance between the fourth lens group G4 and the fifth lens group G5 varies. In this instance, positions of the first lens group G1, the third lens group G3, and the aperture stop S are fixed.

In the zoom lens system according to Example 2, the whole of the third lens group G3 is moved as a vibration reduction lens group in a direction including a component perpendicular to the optical axis, thereby correcting an image blur.

In the zoom lens system according to Example 2, the whole of the fourth lens group G4 is moved to an image side, thereby carrying out focusing from an infinity object to a close object.

Various values associated with the zoom lens system according to Example 2 are listed in Table 2.

In the zoom lens system according to Example 2, in the wide-angle end state, the vibration reduction coefficient is 2.07, the focal length is 10.3 mm, so that in order to correct a rotational camera shake of 0.2 degrees, the moving amount of the vibration reduction lens group is 0.02 mm. In an intermediate focal length state, the vibration reduction coefficient is 2.95, the focal length is 45.0 mm, so that in order to correct a rotational camera shake of 0.2 degrees, the moving amount of the vibration reduction lens group is 0.05 mm. In the telephoto end state, the vibration reduction coefficient is 3.42, the focal length is 97.0 mm, so that in order to correct a rotational camera shake of 0.2 degrees, the moving amount of the vibration reduction lens group is 0.10 mm.

TABLE 2

(Specifications)
Zoom Ratio: 9.42

| | W | M | T |
|---|---|---|---|
| f = | 10.3 | 45.0 | 97.0 |
| FNO = | 4.7 | 5.3 | 6.1 |
| 2ω = | 78.3 | 19.4 | 9.1 |
| Y = | 8.0 | 8.0 | 8.0 |
| TL = | 128.784 | 128.784 | 128.784 |
| Bf = | 19.429 | 17.659 | 14.429 |

(Lens Data)

| i | r | d | nd | νd |
|---|---|---|---|---|
| 1 | 93.1619 | 1.800 | 1.850260 | 32.35 |
| 2 | 39.5859 | 8.000 | 1.497820 | 82.51 |
| 3 | −284.0151 | 0.100 | | |
| 4 | 36.5540 | 5.000 | 1.729157 | 54.66 |
| 5 | 159.4459 | (d5) | | |
| *6 | 127.6881 | 1.000 | 1.816000 | 46.62 |
| 7 | 12.0348 | 5.060 | | |
| 8 | −49.9978 | 0.800 | 1.816000 | 46.62 |
| 9 | 29.2932 | 0.200 | | |
| 10 | 18.9882 | 4.000 | 1.846660 | 23.78 |
| 11 | −37.9737 | 0.471 | | |
| 12 | −28.9543 | 1.000 | 1.834807 | 42.72 |
| 13 | 48.3879 | (d13) | | |
| 14 | ∞ | 0.000 | Aperture Stop S | |
| 15 | 37.6996 | 0.800 | 1.834000 | 37.16 |
| 16 | 17.4219 | 2.500 | 1.593190 | 67.90 |
| 17 | −25.8437 | 0.100 | | |
| 18 | 20.8989 | 2.500 | 1.518601 | 69.97 |
| 19 | −16.6811 | 0.800 | 1.846660 | 23.78 |
| 20 | −31.8438 | (d20) | | |
| 21 | −36.4910 | 0.800 | 1.834807 | 42.72 |
| 22 | 29.3199 | 0.896 | | |
| 23 | −27.0631 | 0.800 | 1.834807 | 42.72 |
| 24 | 18.2268 | 1.800 | 1.846660 | 23.78 |
| 25 | −34.6409 | (d25) | | |
| 26 | −50.1069 | 2.000 | 1.497820 | 82.51 |
| 27 | −19.1363 | 0.200 | | |
| 28 | 96.2015 | 1.000 | 1.834807 | 42.72 |
| 29 | 23.1567 | 4.000 | 1.497820 | 82.51 |
| 30 | −46.1208 | 0.211 | | |
| 31 | 23.5512 | 3.000 | 1.497820 | 82.51 |
| 32 | −152.9275 | 9.791 | | |
| 33 | −37.8588 | 1.000 | 1.846660 | 23.78 |
| 34 | −283.7365 | BF | | |

(Aspherical Surface Data)

Surface Number: 6
κ = 8.8617
A4 = 1.80790E−07
A6 = −6.06139E−09
A8 = 4.62589E−11
A10 = −2.20120E−13

(Variable Distances upon Zooming)

| | W | M | T |
|---|---|---|---|
| upon focusing on an infinity object | | | |
| d5 = | 0.800 | 20.665 | 28.181 |
| d13 = | 29.606 | 9.740 | 2.225 |
| d20 = | 0.800 | 9.620 | 15.486 |
| d25 = | 18.520 | 11.469 | 8.834 |
| Bf = | 19.429 | 17.659 | 14.429 |

TABLE 2-continued

| upon focusing on a close object | | | |
|---|---|---|---|
| d5 = | 0.800 | 20.665 | 28.181 |
| d13 = | 29.606 | 9.740 | 2.225 |
| d20 = | 0.855 | 9.821 | 15.897 |
| d25 = | 18.465 | 11.268 | 8.423 |
| Bf = | 19.429 | 17.659 | 14.429 |

(Lens Group Data)

| Group | I | Focal Length |
|---|---|---|
| 1 | 1 | 57.030 |
| 2 | 6 | −10.449 |
| 3 | 15 | 16.471 |
| 4 | 21 | −18.248 |
| 5 | 26 | 28.038 |

(Values for Conditional Expressions)

(1) f1/(−f2) = 5.46
(2) f3/f5 = 0.59
(3) (−f4)/f5 = 0.65
(4) f2/f4 = 0.57
(5) (−f2)/f5 = 0.37
(6) f1/f3 = 3.46
(7) f1/(−f4) = 3.13

FIGS. 7A and 7B are graphs showing various aberrations of the zoom lens system according to Example 2 in a wide-angle end state upon focusing on infinity, in which FIG. 7A shows various aberrations, and FIG. 7B shows coma upon vibration reduction with respect to a rotational camera shake of 0.2 degrees.

Figure 8A:
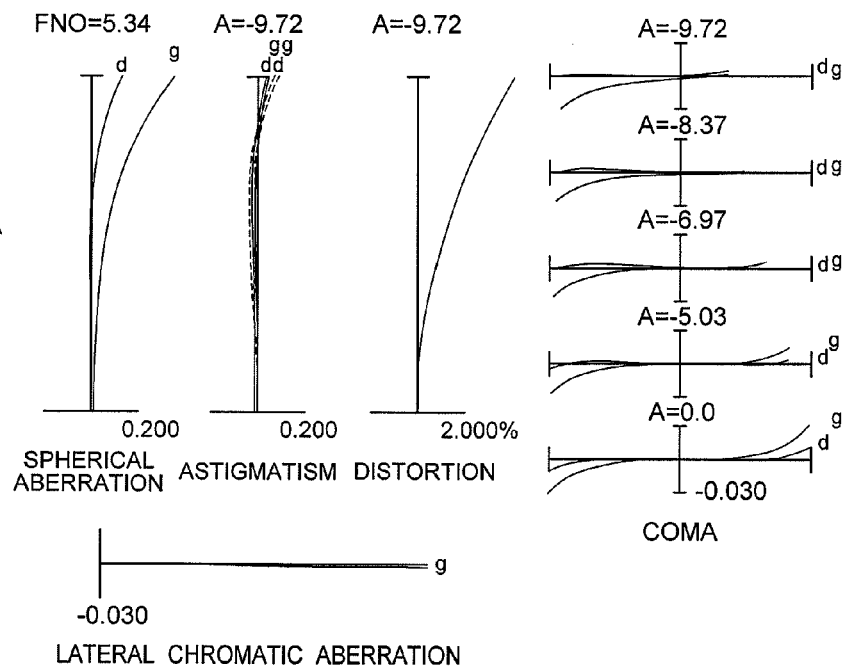
Figure 8B:
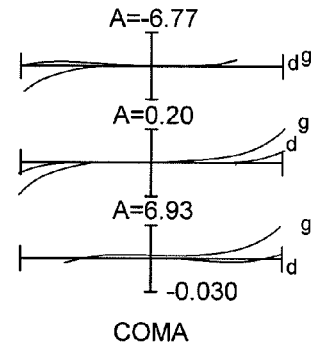

FIGS. 8A and 8B are graphs showing various aberrations of the zoom lens system according to Example 2 in an intermediate focal length state upon focusing on infinity, in which FIG. 8A shows various aberrations, and FIG. 8B shows coma upon vibration reduction with respect to a rotational camera shake of 0.2 degrees.

FIGS. 9A and 9B are graphs showing various aberrations of the zoom lens system according to Example 2 in a telephoto end state upon focusing on infinity, in which FIG. 9A shows various aberrations, and FIG. 9B shows coma upon vibration reduction with respect to a rotational camera shake of 0.2 degrees.

Figure 10A:
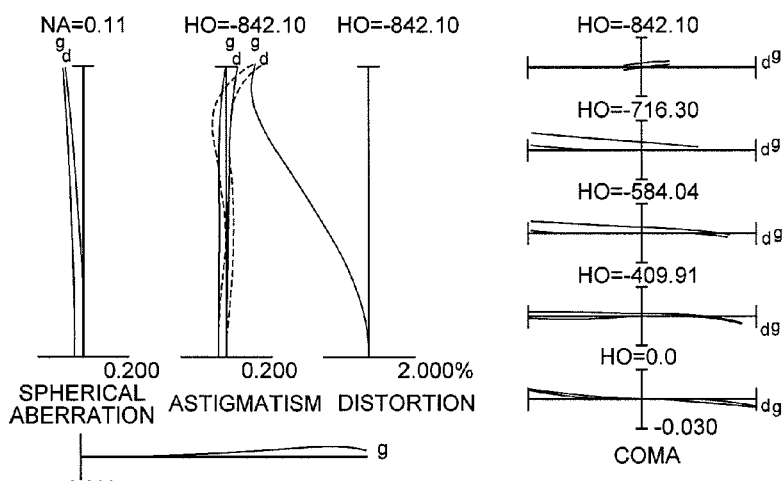
Figure 10B:
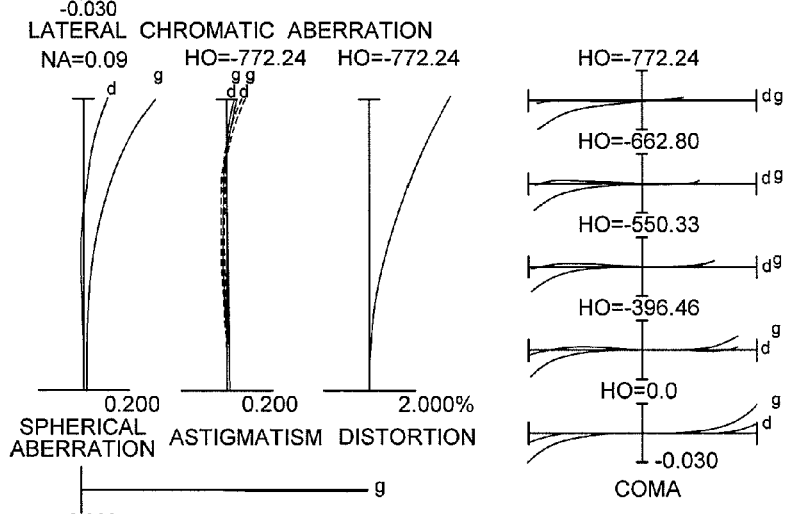
Figure 10C:
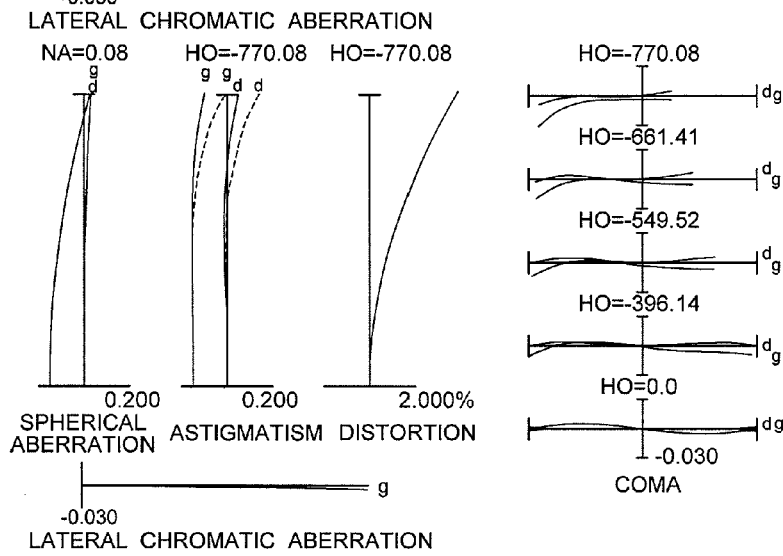

FIGS. 10A, 10B and 10C are graphs showing various aberrations of the zoom lens system according to Example 2 upon focusing on a close object, in which FIG. 10A is in the wide-angle end state, FIG. 10B is in the intermediate focal length state, and FIG. 100 is in the telephoto end state.

As is apparent from the respective graphs, the zoom lens system according to Example 2 shows superb optical performance as a result of good corrections to various aberrations in each focal length state from the wide-angle end state through the telephoto end state even upon carrying out vibration reduction.

Example 3

FIG. 11 is a sectional view showing a lens configuration of a zoom lens system according to Example 3 of the present application.

The zoom lens system according to Example 3 is composed of, in order from an object side, a first lens group G1 having positive refractive power, a second lens group G2 having negative refractive power, an aperture stop S, a third lens group G3 having positive refractive power, a fourth lens group G4 having negative refractive power, and a fifth lens group G5 having positive refractive power.

The first lens group G1 is composed of, in order from the object side, a cemented positive lens constructed by a negative meniscus lens L11 having a convex surface facing the object side cemented with a double convex positive lens L12, and a positive meniscus lens L13 having a convex surface facing the object side.

The second lens group G2 is composed of, in order from the object side, a negative meniscus lens L21 having a convex surface facing the object side, a double concave negative lens L22, a double convex positive lens L23, and a double concave negative lens L24.

The third lens group G3 is composed of, in order from the object side, a cemented positive lens constructed by a negative meniscus lens L31 having a convex surface facing the object side cemented with a double convex positive lens L32, and a cemented positive lens constructed by a double convex positive lens L33 cemented with a negative meniscus lens L34 having a concave surface facing the object side.

The fourth lens group G4 is composed of, in order from the object side, a double concave negative lens L41, and a cemented negative lens constructed by a double concave negative lens L42 cemented with a double convex positive lens L43.

The fifth lens group G5 is composed of, in order from the object side, a double convex positive lens L51 and a cemented positive lens constructed by a double convex positive lens L52 cemented with a negative meniscus lens L53 having a concave surface facing the object side.

In the zoom lens system according to Example 3, upon zooming from a wide-angle end state to a telephoto end state, the second lens group G2, the fourth lens group G4 and the fifth lens group G5 are moved along an optical axis such that a distance between the first lens group G1 and the second lens group G2 varies, a distance between the second lens group G2 and the third lens group G3 varies, a distance between the third lens group G3 and the fourth lens group G4 varies, and a distance between the fourth lens group G4 and the fifth lens group G5 varies. In this instance, positions of the first lens group G1, the third lens group G3, and the aperture stop S are fixed.

In the zoom lens system according to Example 3, the whole of the third lens group G3 is moved as a vibration reduction lens group in a direction including a component perpendicular to the optical axis, thereby correcting an image blur.

In the zoom lens system according to Example 3, the whole of the fourth lens group G4 is moved to an image side, thereby carrying out focusing from an infinity object to a close object.

Various values associated with the zoom lens system according to Example 3 are listed in Table 3.

In the zoom lens system according to Example 3, in the wide-angle end stat, the vibration reduction coefficient is 2.08, the focal length is 10.3 mm, so that in order to correct a rotational camera shake of 0.2 degrees, the moving amount of the vibration reduction lens group is 0.02 mm. In an intermediate focal length state, the vibration reduction coefficient is 2.95, the focal length is 45.0 mm, so that in order to correct a rotational camera shake of 0.2 degrees, the moving amount of the vibration reduction lens group is 0.05 mm. In the telephoto end state, the vibration reduction coefficient is 3.42, the focal length is 97.0 mm, so that in order to correct a rotational camera shake of 0.2 degrees, the moving amount of the vibration reduction lens group is 0.10 mm.

TABLE 3

(Specifications)
Zoom Ratio: 9.42

|   | W | M | T |
|---|---|---|---|
| f = | 10.3 | 45.0 | 97.0 |
| FNO = | 4.7 | 5.3 | 6.1 |
| 2ω = | 78.1 | 19.5 | 9.1 |
| Y = | 8.0 | 8.0 | 8.0 |
| TL = | 128.784 | 128.784 | 128.784 |
| Bf = | 27.465 | 24.116 | 20.465 |

(Lens Data)

| i | r | d | nd | νd |
|---|---|---|---|---|
| 1 | 86.5566 | 1.600 | 1.850260 | 32.35 |
| 2 | 39.0403 | 8.200 | 1.497820 | 82.51 |
| 3 | −273.4518 | 0.100 | | |
| 4 | 33.7862 | 4.800 | 1.729157 | 54.66 |
| 5 | 111.7851 | (d5) | | |
| *6 | 114.8189 | 1.000 | 1.816000 | 46.62 |
| 7 | 10.7372 | 5.676 | | |
| 8 | −53.6644 | 0.800 | 1.816000 | 46.62 |
| 9 | 36.5687 | 0.200 | | |
| 10 | 17.8230 | 4.000 | 1.846660 | 23.78 |
| 11 | −53.3504 | 0.342 | | |
| 12 | −43.0589 | 1.000 | 1.834807 | 42.72 |
| 13 | 33.3093 | (d13) | | |
| 14 | ∞ | 0.000 | Aperture Stop S | |
| 15 | 32.7360 | 0.800 | 1.850260 | 32.35 |
| 16 | 15.8207 | 2.500 | 1.593190 | 67.90 |
| 17 | −24.5965 | 0.100 | | |
| 18 | 22.9169 | 2.500 | 1.518601 | 69.97 |
| 19 | −20.0347 | 0.800 | 1.846660 | 23.78 |
| 20 | −37.9415 | (d20) | | |
| 21 | −31.8905 | 0.800 | 1.834807 | 42.72 |
| 22 | 31.4348 | 1.419 | | |
| 23 | −16.4154 | 0.800 | 1.834807 | 42.72 |
| 24 | 39.1141 | 1.800 | 1.846660 | 23.78 |
| 25 | −18.0688 | (d25) | | |
| 26 | 67.8920 | 4.000 | 1.497820 | 82.51 |
| 27 | −20.3825 | 4.416 | | |
| 28 | 32.0419 | 4.000 | 1.497820 | 82.51 |
| 29 | −17.2951 | 1.000 | 1.850260 | 32.35 |
| 30 | −184.4460 | BF | | |

(Aspherical Surface Data)

Surface Number: 6
κ = 13.3663
A4 = −5.75816E−07
A6 = −3.00768E−10
A8 = −1.33166E−11
A10 = 2.80156E−14

(Variable Distances upon Zooming)

|   | W | M | T |
|---|---|---|---|
| upon focusing on an infinity object | | | |
| d5 = | 0.810 | 20.266 | 27.547 |
| d13 = | 29.126 | 9.670 | 2.389 |
| d20 = | 0.801 | 10.534 | 16.510 |
| d25 = | 17.930 | 11.545 | 9.221 |
| Bf = | 27.465 | 24.116 | 20.465 |
| upon focusing on a close object | | | |
| d5 = | 0.810 | 20.266 | 27.547 |
| d13 = | 29.126 | 9.670 | 2.389 |
| d20 = | 0.855 | 10.738 | 16.927 |
| d25 = | 17.875 | 11.342 | 8.804 |
| Bf = | 27.465 | 24.116 | 20.465 |

(Lens Group Data)

| Group | I | Focal Length |
|---|---|---|
| 1 | 1 | 55.688 |
| 2 | 6 | −10.152 |
| 3 | 15 | 16.625 |
| 4 | 21 | −20.042 |
| 5 | 26 | 30.416 |

(Values for Conditional Expressions)

(1) f1/(−f2) = 5.49
(2) f3/f5 = 0.55
(3) (−f4)/f5 = 0.66
(4) f2/f4 = 0.51
(5) (−f2)/f5 = 0.33
(6) f1/f3 = 3.35
(7) f1/(−f4) = 2.78

Figure 12A:
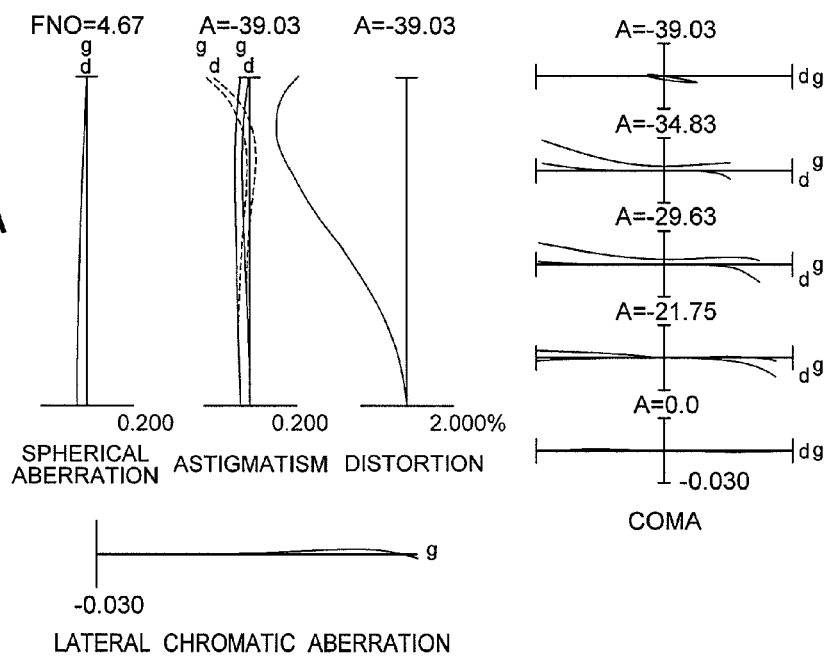
Figure 12B:
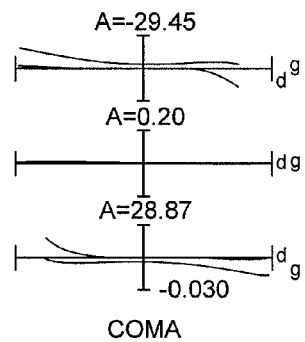

FIGS. 12A and 12B are graphs showing various aberrations of the zoom lens system according to Example 3 in a wide-angle end state upon focusing on infinity, in which FIG. 12A shows various aberrations, and FIG. 12B shows coma upon vibration reduction with respect to a rotational camera shake of 0.2 degrees.

Figure 13A:
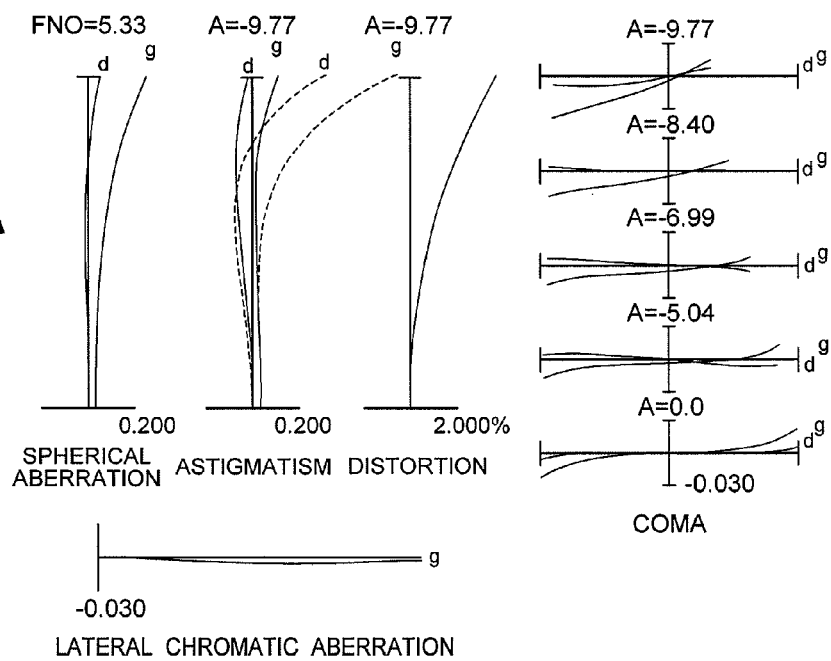
Figure 13B:
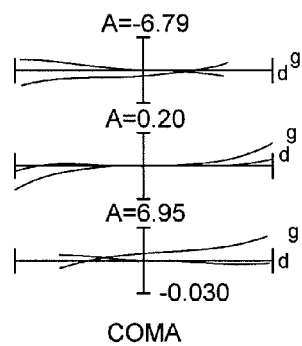

FIGS. 13A and 13B are graphs showing various aberrations of the zoom lens system according to Example 3 in an intermediate focal length state upon focusing on infinity, in which FIG. 13A shows various aberrations, and FIG. 13B shows coma upon vibration reduction with respect to a rotational camera shake of 0.2 degrees.

Figure 14A:
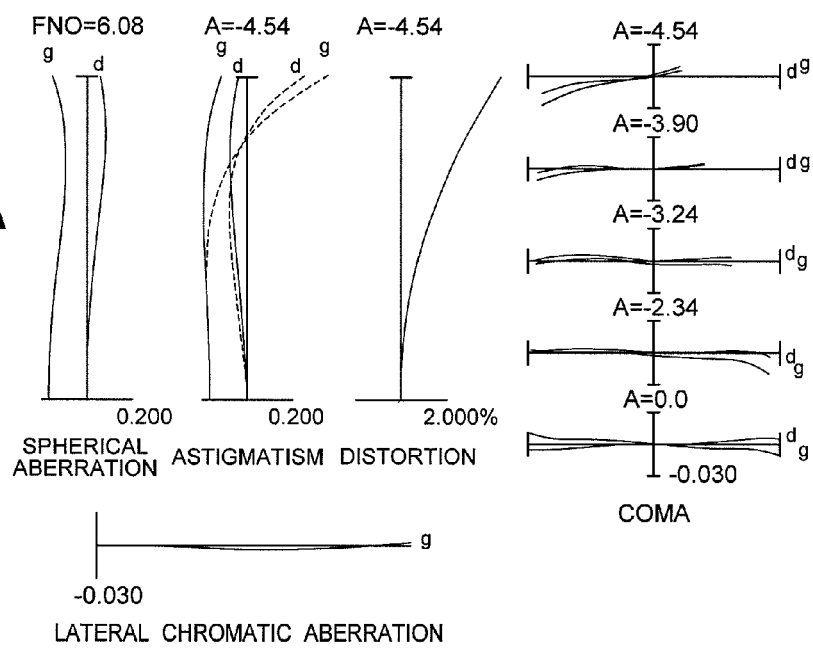
Figure 14B:
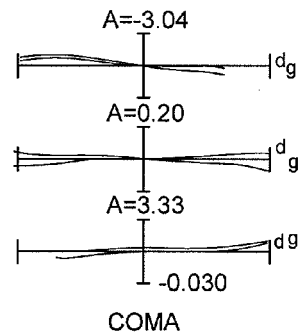

FIGS. 14A and 14B are graphs showing various aberrations of the zoom lens system according to Example 3 in a telephoto end state upon focusing on infinity, in which FIG. 14A shows various aberrations, and FIG. 14B shows coma upon vibration reduction with respect to a rotational camera shake of 0.2 degrees.

Figure 15A:
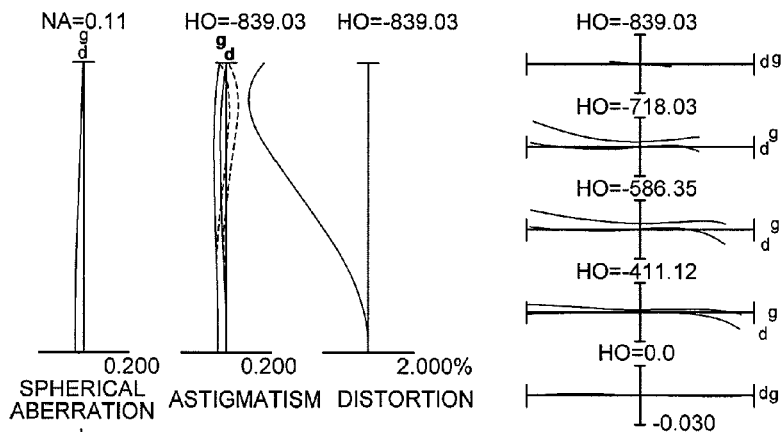
Figure 15B:
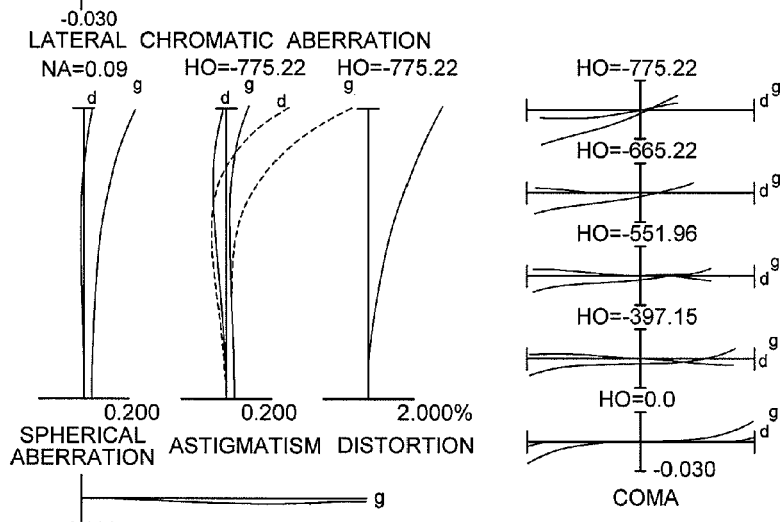
Figure 15C:
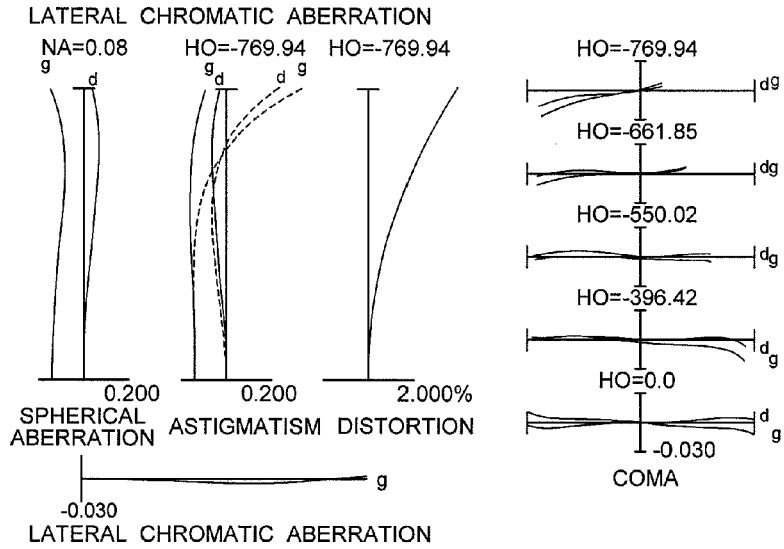

FIGS. 15A, 15B and 15C are graphs showing various aberrations of the zoom lens system according to Example 3 upon focusing on a close object, in which FIG. 15A is in the wide-angle end state, FIG. 15B is in the intermediate focal length state, and FIG. 15C is in the telephoto end state.

As is apparent from the respective graphs, the zoom lens system according to Example 3 shows superb optical performance as a result of good corrections to various aberrations in each focal length state from the wide-angle end state through the telephoto end state even upon carrying out vibration reduction.

Example 4

Figure 16:
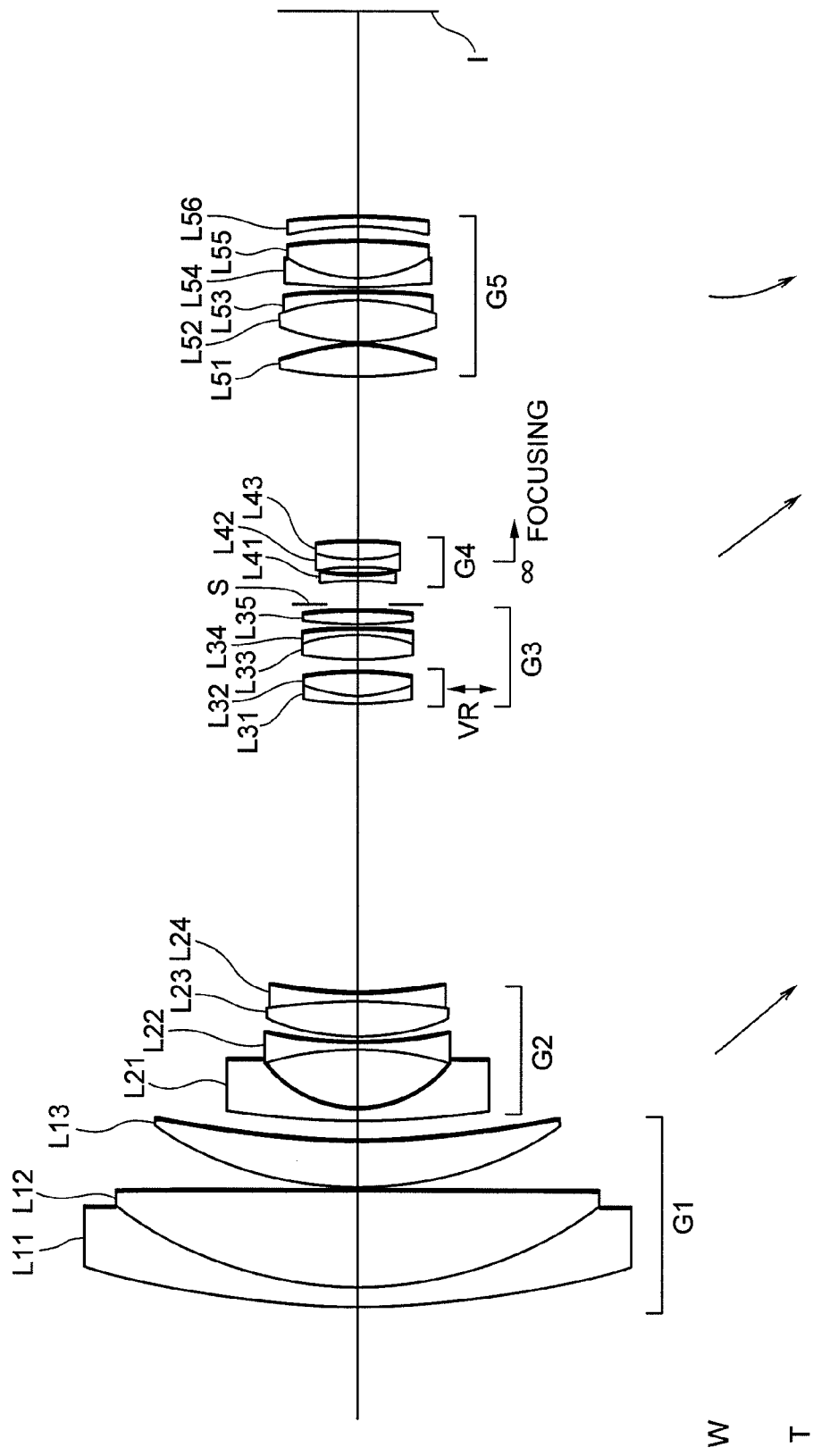
FIG. 16 is a sectional view showing a lens configuration of a zoom lens system according to Example 4 of the present application.

FIG. 16 is a sectional view showing a lens configuration of a zoom lens system according to Example 4 of the present application.

The zoom lens system according to Example 4 is composed of, in order from an object side, a first lens group G1 having positive refractive power, a second lens group G2 having negative refractive power, a third lens group G3 having positive refractive power, an aperture stop S, a fourth lens group G4 having negative refractive power, and a fifth lens group G5 having positive refractive power.

The first lens group G1 is composed of, in order from the object side, a cemented positive lens constructed by a negative meniscus lens L11 having convex surface facing the object side cemented with a double convex positive lens L12, and a positive meniscus lens L13 having a convex surface facing the object side.

The second lens group G2 is composed of, in order from the object side, a negative meniscus lens L21 having a convex surface facing the object side, a double concave negative lens L22, and a cemented positive lens constructed by a double convex positive lens L23 cemented with a double concave negative lens L24.

The third lens group G3 is composed of, in order from the object side, a cemented positive lens constructed by a negative meniscus lens L31 having a convex surface facing the object side cemented with a double convex positive lens L32, a cemented positive lens constructed by a double convex positive lens L33 cemented with a negative meniscus lens L34 having a concave surface facing the object side, and a double convex positive lens L35.

The fourth lens group G4 is composed of, in order from the object side, a double concave negative lens L41, and a cemented negative lens constructed by a double concave negative lens L42 cemented with a double convex positive lens L43.

The fifth lens group G5 is composed of, in order from the object side, a double convex positive lens L51, a cemented positive lens constructed by a double convex positive lens L52 cemented with a negative meniscus lens L53 having a concave surface facing the object side, a cemented negative lens constructed by a negative meniscus lens L54 having a convex surface facing the object side cemented with a double convex positive lens L55, and a negative meniscus lens L56 having a concave surface facing the object side.

In the zoom lens system according to Example 4, upon zooming from a wide-angle end state to a telephoto end state, the second lens group G2, the fourth lens group G4 and the fifth lens group G5 are moved along an optical axis such that a distance between the first lens group G1 and the second lens group G2 varies, a distance between the second lens group G2 and the third lens group G3 varies, a distance between the third lens group G3 and the fourth lens group G4 varies, and a distance between the fourth lens group G4 and the fifth lens group G5 varies. In this instance, positions of the first lens group G1, the third lens group G3, and the aperture stop S are fixed.

In the zoom lens system according to Example 4, the cemented positive lens constructed by the negative meniscus lens L31 cemented with the double convex positive lens L32 is moved as a vibration reduction lens group in a direction including a component perpendicular to the optical axis, thereby correcting an image blur.

In the zoom lens system according to Example 4, the whole of the fourth lens group G4 is moved to an image side, thereby carrying out focusing from an infinity object to a close object.

Various values associated with the zoom lens system according to Example 4 are listed in Table 4.

In the zoom lens system according to Example 4, in the wide-angle end state, the vibration reduction coefficient is 0.93, the focal length is 10.3 mm, so that in order to correct a rotational camera shake of 0.2 degrees, the moving amount of the vibration reduction lens group is 0.04 mm. In an intermediate focal length state, the vibration reduction coefficient is 1.33, the focal length is 45.0 mm, so that in order to correct a rotational camera shake of 0.2 degrees, the moving amount of the vibration reduction lens group is 0.12 mm. In the telephoto end state, the vibration reduction coefficient is 1.62, the focal length is 97.0 mm, so that in order to correct a rotational camera shake of 0.2 degrees, the moving amount of the vibration reduction lens group is 0.21 mm.

TABLE 4

(Specifications)
Zoom Ratio: 9.42

|  | W | M | T |
|---|---|---|---|
| f = | 10.3 | 45.0 | 97.0 |
| FNO = | 4.6 | 5.5 | 5.9 |
| 2ω = | 78.6 | 19.4 | 9.0 |
| Y = | 8.0 | 8.0 | 8.0 |
| TL = | 136.663 | 136.663 | 136.663 |
| Bf = | 21.775 | 17.923 | 14.148 |

TABLE 4-continued (Lens Data)

| i | r | d | nd | vd |
|---|---|---|---|---|
| 1 | 102.3091 | 2.000 | 1.795040 | 28.69 |
| 2 | 41.8010 | 10.400 | 1.497820 | 82.57 |
| 3 | −1007.6756 | 0.100 | | |
| 4 | 37.6062 | 5.150 | 1.834810 | 42.73 |
| 5 | 98.9884 | (d5) | | |
| *6 | 99.2450 | 0.150 | 1.553890 | 38.09 |
| 7 | 94.6723 | 1.400 | 1.834810 | 42.73 |
| 8 | 12.0783 | 6.000 | | |
| 9 | −32.7960 | 1.000 | 1.834810 | 42.73 |
| 10 | 46.9143 | 0.400 | | |
| 11 | 25.5606 | 3.800 | 1.846660 | 23.80 |
| 12 | −54.2180 | 1.000 | 1.816000 | 46.59 |
| 13 | 54.1534 | (d13) | | |
| 14 | 34.7874 | 0.800 | 1.850260 | 32.35 |
| 15 | 16.6502 | 2.600 | 1.618000 | 63.34 |
| 16 | −37.1204 | 1.200 | | |
| 17 | 48.7843 | 2.600 | 1.497820 | 82.57 |
| 18 | −18.5410 | 0.800 | 1.850260 | 32.35 |
| 19 | −41.7038 | 0.300 | | |
| 20 | 47.8525 | 1.600 | 1.696800 | 55.52 |
| 21 | −59.5425 | 0.500 | | |
| 22 | ∞ | (d22) | Aperture Stop S | |
| 23 | −33.1327 | 0.800 | 1.816000 | 46.59 |
| 24 | 23.8736 | 0.700 | | |
| 25 | −23.1424 | 0.800 | 1.816000 | 46.59 |
| 26 | 16.9872 | 2.000 | 1.808090 | 22.74 |
| 27 | −33.9829 | (d27) | | |
| 28 | 49.4602 | 3.500 | 1.589130 | 61.18 |
| *29 | −19.7954 | 0.100 | | |
| 30 | 23.4122 | 4.400 | 1.497820 | 82.57 |
| 31 | −23.4006 | 1.000 | 1.950000 | 29.37 |
| 32 | −80.0819 | 0.300 | | |
| 33 | 85.4967 | 1.000 | 1.883000 | 40.66 |
| 34 | 14.9004 | 4.000 | 1.517420 | 52.20 |
| 35 | −50.2458 | 1.450 | | |
| 36 | −30.3940 | 1.000 | 2.000690 | 25.46 |
| 37 | −82.9601 | BF | | |

(Aspherical Surface Data)

Surface Number: 6

κ = 15.1751
A4 = 4.64891E−06
A6 = −1.26998E−08
A8 = −3.35661E−10
A10 = 2.59761E−12
A12 = −8.51930E−15
A14 = 1.02560E−17

Surface Number: 29

κ = 1.2313
A4 = 1.39795E−05
A6 = 3.25121E−08

(Variable Distances upon Zooming)

|  | W | M | T |
|---|---|---|---|
| upon focusing on an infinity object | | | |
| d5 = | 1.822 | 23.119 | 30.744 |
| d13 = | 30.318 | 9.021 | 1.396 |
| d22 = | 2.508 | 12.391 | 20.536 |
| d27 = | 17.391 | 11.359 | 6.988 |
| Bf = | 21.775 | 17.923 | 14.148 |
| upon focusing on a close object | | | |
| d5 = | 1.822 | 23.119 | 30.744 |
| d13 = | 30.318 | 9.021 | 1.396 |
| d22 = | 2.557 | 12.557 | 20.874 |
| d27 = | 17.341 | 11.193 | 6.650 |
| Bf = | 21.775 | 17.923 | 14.148 |

TABLE 4-continued (Lens Group Data)

| Group | I | Focal Length |
|---|---|---|
| 1 | 1 | 65.224 |
| 2 | 6 | −10.504 |
| 3 | 14 | 16.830 |
| 4 | 23 | −14.660 |
| 5 | 28 | 24.633 |

(Values for Conditional Expressions)

(1) f1/(−f2) = 6.21
(2) f3/f5 = 0.68
(3) (−f4)/f5 = 0.60
(4) f2/f4 = 0.72
(5) (−f2)/f5 = 0.43
(6) f1/f3 = 3.88
(7) f1/(−f4) = 4.45

Figure 17A:
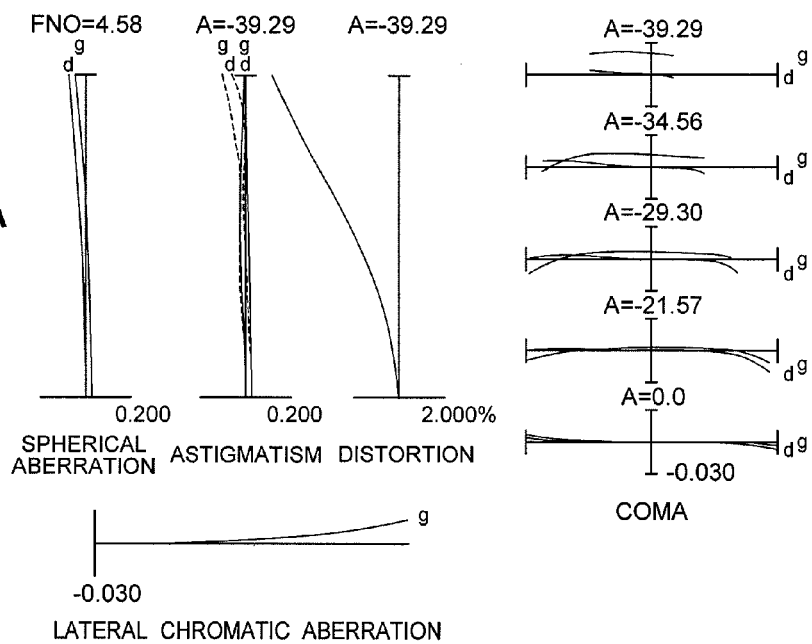
Figure 17B:
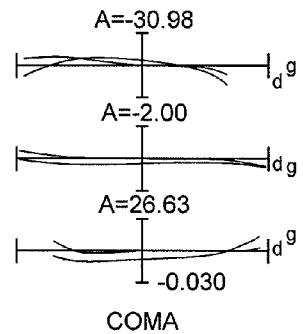

FIGS. 17A and 17B are graphs showing various aberrations of the zoom lens system according to Example 4 in a wide-angle end state upon focusing on infinity, in which FIG. 17A shows various aberrations, and FIG. 17B shows coma upon vibration reduction with respect to a rotational camera shake of 0.2 degrees.

Figure 18A:
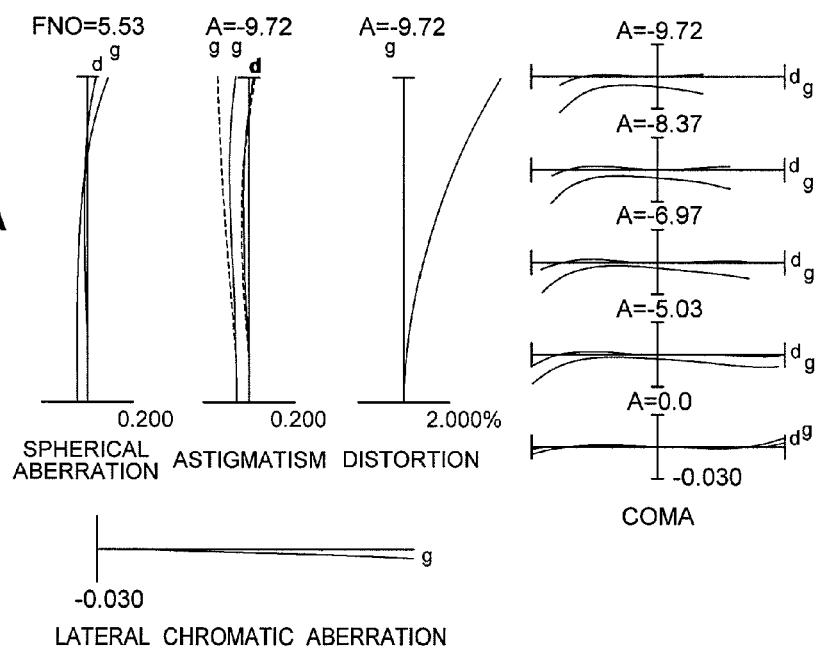
Figure 18B:
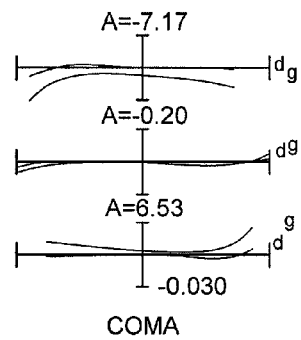

FIGS. 18A and 18B are graphs showing various aberrations of the zoom lens system according to Example 4 in an intermediate focal length state upon focusing on infinity, in which FIG. 18A shows various aberrations, and FIG. 18B shows coma upon vibration reduction with respect to a rotational camera shake of 0.2 degrees.

Figure 19A:
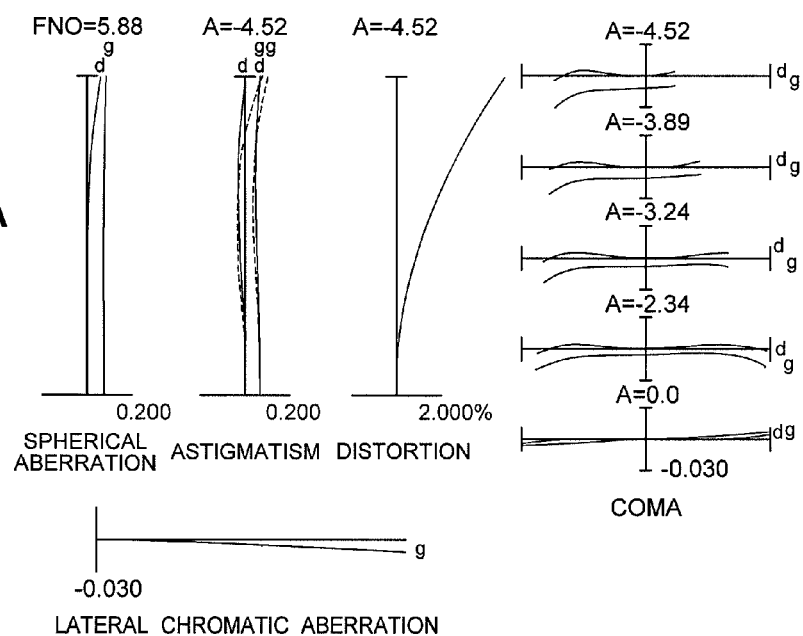
Figure 19B:
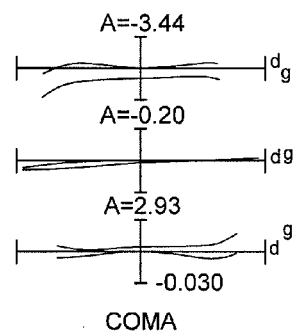

FIGS. 19A and 19B are graphs showing various aberrations of the zoom lens system according to Example 4 in a telephoto end state upon focusing on infinity, in which FIG. 19A shows various aberrations, and FIG. 19B shows coma upon vibration reduction with respect to a rotational camera shake of 0.2 degrees.

Figure 20A:
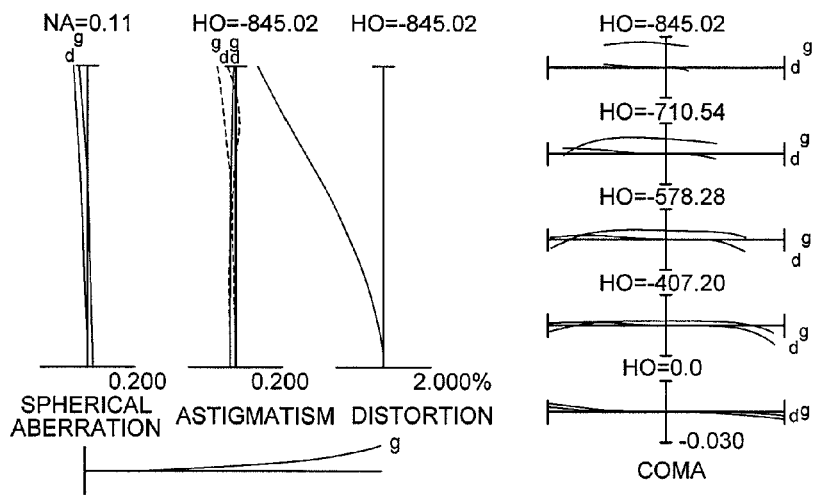
Figure 20B:
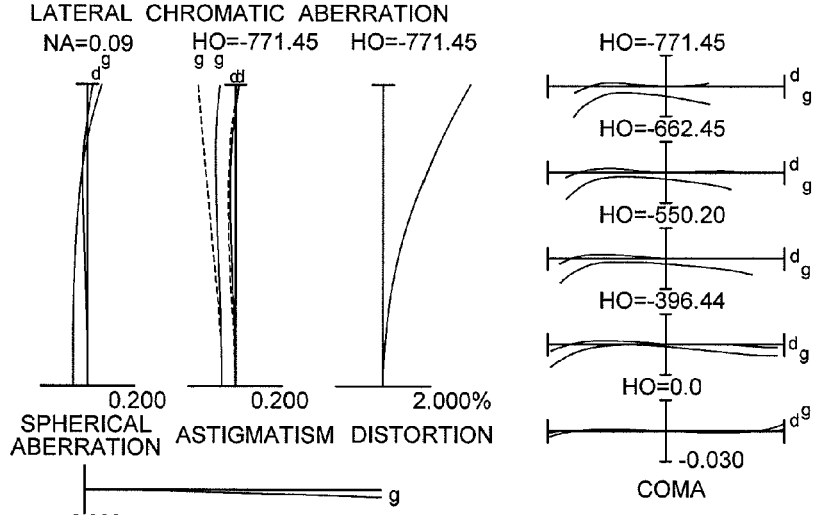
Figure 20C:
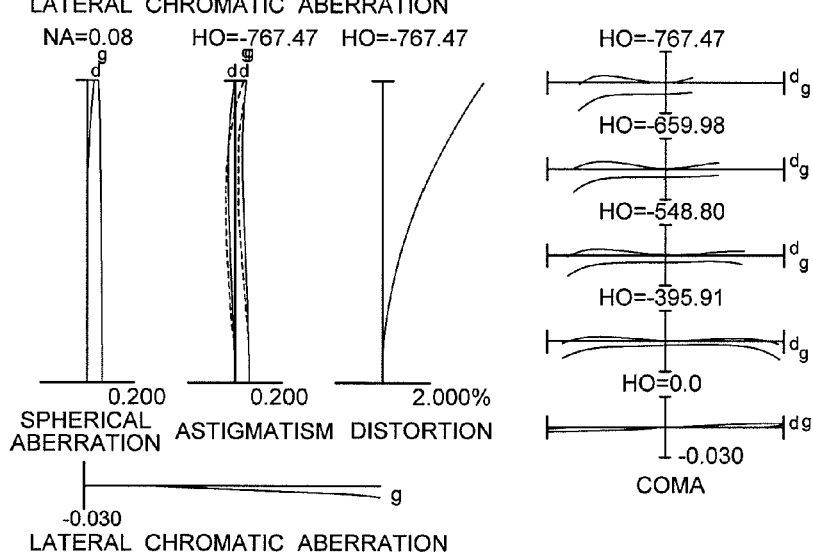

FIGS. 20A, 20B and 20C are graphs showing various aberrations of the zoom lens system according to Example 4 upon focusing on a close object, in which FIG. 20A is in the wide-angle end state, FIG. 20B is in the intermediate focal length state, and FIG. 20C is in the telephoto end state.

As is apparent from the respective graphs, the zoom lens system according to Example 4 shows superb optical performance as a result of good corrections to various aberrations in each focal length state from the wide-angle end state through the telephoto end state even upon carrying out vibration reduction.

Example 5

FIG. 21 is a sectional view showing a lens configuration of a zoom lens system according to Example 5 of the present application.

The zoom lens system according to Example 5 is composed of, in order from an object side, a first lens group G1 having positive refractive power, a second lens group G2 having negative refractive power, a third lens group G3 having positive refractive power, an aperture stop S, a fourth lens group G4 having negative refractive power, and a fifth lens group G5 having positive refractive power.

The first lens group G1 is composed of, in order from the object side, a cemented positive lens constructed by a negative meniscus lens L11 having a convex surface facing the object side cemented with a double convex positive lens L12, and a positive meniscus lens L13 having a convex surface facing the object side.

The second lens group G2 is composed of, in order from the object side, a negative meniscus lens L21 having a convex surface facing the object side, a double concave negative lens L22, and a cemented positive lens constructed by a double convex positive lens L23 cemented with a double concave negative lens L24.

The third lens group G3 is composed of, in order from the object side, a cemented positive lens constructed by a negative meniscus lens L31 having a convex surface facing the object side cemented with a double convex positive lens L32, a cemented positive lens constructed by a double convex positive lens L33 cemented with a negative meniscus lens L34 having a concave surface facing the object side, and a double convex positive lens L35.

The fourth lens group G4 is composed of, in order from the object side, a double concave negative lens L41, and a cemented negative lens constructed be a double concave negative lens L42 cemented with a double convex positive lens L43.

The fifth lens group G5 is composed of, in order from the object side, a double convex positive lens L51, a cemented positive lens constructed by a double convex positive lens L52 cemented with a negative meniscus lens L53 having a concave surface facing the object side, a cemented negative lens constructed by a negative meniscus lens L54 having a convex surface facing the object side cemented with a double convex positive lens L55, and a negative meniscus lens L56 having a concave surface facing the object side.

In the zoom lens system according to Example 5, upon zooming from a wide-angle end state to a telephoto end state, the second lens group G2, the fourth lens group G4 and the fifth lens group G5 are moved along an optical axis such that a distance between the first lens group G1 and the second lens group G2 varies, a distance between the second lens group G2 and the third lens group G3 varies, a distance between the third lens group G3 and the fourth lens group G4 varies, and a distance between the fourth lens group G4 and the fifth lens group G5 varies. In this instance, the first lens group G1, the third lens group G3, and the aperture stop S are fixed.

In the zoom lens system according to Example 5, the whole of the second lens group G2 is moved as a vibration reduction lens group in a direction including a component perpendicular to the optical axis, thereby correcting an image blur.

In the zoom lens system according to Example 5, the whole of the fourth lens group G4 is moved to an image side, thereby carrying out focusing from an infinity object to a close object.

Various values associated with the zoom lens system according to Example 5 are listed in Table 5.

In the zoom lens system according to Example 5, in the wide-angle end state, the vibration reduction coefficient is 0.85, the focal length is 10.3 mm, so that in order to correct a rotational camera shake of 0.2 degrees, the moving amount of the vibration reduction lens group is 0.04 mm. In an intermediate focal length state, the vibration reduction coefficient is 2.24, the focal length is 45.0 mm, so that in order to correct a rotational camera shake of 0.2 degrees, the moving amount of the vibration reduction lens group is 0.07 mm. In the telephoto end state, the vibration reduction coefficient is 3.76, the focal length is 97.0 mm, so that in order to correct a rotational camera shake of 0.2 degrees, the moving amount of the vibration reduction lens group is 0.09 mm.

TABLE 5

(Specifications)
Zoom Ratio: 9.42

| | W | M | T |
|---|---|---|---|
| f = | 10.3 | 45.0 | 97.0 |
| FNO = | 4.6 | 5.5 | 5.9 |
| 2ω = | 78.6 | 19.4 | 9.0 |
| Y = | 8.0 | 8.0 | 8.0 |

TABLE 5-continued

| TL = | 136.663 | 136.663 | 136.663 |
|---|---|---|---|
| Bf = | 21.775 | 17.923 | 14.148 |

(Lens Data)

| i | r | d | nd | νd |
|---|---|---|---|---|
| 1 | 102.3091 | 2.000 | 1.795040 | 28.69 |
| 2 | 41.8010 | 10.400 | 1.497820 | 82.57 |
| 3 | −1007.6756 | 0.100 | | |
| 4 | 37.6062 | 5.150 | 1.834810 | 42.73 |
| 5 | 98.9884 | (d5) | | |
| *6 | 99.2450 | 0.150 | 1.553890 | 38.09 |
| 7 | 94.6723 | 1.400 | 1.834810 | 42.73 |
| 8 | 12.0783 | 6.000 | | |
| 9 | −32.7960 | 1.000 | 1.834810 | 42.73 |
| 10 | 46.9143 | 0.400 | | |
| 11 | 25.5606 | 3.800 | 1.846660 | 23.80 |
| 12 | −54.2180 | 1.000 | 1.816000 | 46.59 |
| 13 | 54.1534 | (d13) | | |
| 14 | 34.7874 | 0.800 | 1.850260 | 32.35 |
| 15 | 16.6502 | 2.600 | 1.618000 | 63.34 |
| 16 | −37.1204 | 1.200 | | |
| 17 | 48.7843 | 2.600 | 1.497820 | 82.57 |
| 18 | −18.5410 | 0.800 | 1.850260 | 32.35 |
| 19 | −41.7038 | 0.300 | | |
| 20 | 47.8525 | 1.600 | 1.696800 | 55.52 |
| 21 | −59.5425 | 0.500 | | |
| 22 | ∞ | (d22) | Aperture Stop S | |
| 23 | −33.1327 | 0.800 | 1.816000 | 46.59 |
| 24 | 23.8736 | 0.700 | | |
| 25 | −23.1424 | 0.800 | 1.816000 | 46.59 |
| 26 | 16.9872 | 2.000 | 1.808090 | 22.74 |
| 27 | −33.9829 | (d27) | | |
| 28 | 49.4602 | 3.500 | 1.589130 | 61.18 |
| *29 | −19.7954 | 0.100 | | |
| 30 | 23.4122 | 4.400 | 1.497820 | 82.57 |
| 31 | −23.4006 | 1.000 | 1.950000 | 29.37 |
| 32 | −80.0819 | 0.300 | | |
| 33 | 85.4967 | 1.000 | 1.883000 | 40.66 |
| 34 | 14.9004 | 4.000 | 1.517420 | 52.20 |
| 35 | −50.2458 | 1.450 | | |
| 36 | −30.3940 | 1.000 | 2.000690 | 25.46 |
| 37 | −82.9601 | BF | | |

(Aspherical Surface Data)

Surface Number: 6

κ = 15.1751
A4 = 4.64891E−06
A6 = −1.26998E−08
A8 = −3.35661E−10
A10 = 2.59761E−12
A12 = −8.51930E−15
A14 = 1.02560E−17

Surface Number: 29

κ = 1.2313
A4 = 1.39795E−05
A6 = 3.25121E−08

(Variable Distances upon Zooming)

| | W | M | T |
|---|---|---|---|
| upon focusing on an infinity object | | | |
| d5 = | 1.822 | 23.119 | 30.744 |
| d13 = | 30.318 | 9.021 | 1.396 |
| d22 = | 2.508 | 12.391 | 20.536 |
| d27 = | 17.391 | 11.359 | 6.988 |
| Bf = | 21.775 | 17.923 | 14.148 |
| upon focusing on a close object | | | |
| d5 = | 1.822 | 23.119 | 30.744 |
| d13 = | 30.318 | 9.021 | 1.396 |
| d22 = | 2.557 | 12.557 | 20.874 |
| d27 = | 17.341 | 11.193 | 6.650 |
| Bf = | 21.775 | 17.923 | 14.148 |

(Lens Group Data)

| Group | I | Focal Length |
|---|---|---|
| 1 | 1 | 65.224 |
| 2 | 6 | −10.504 |
| 3 | 14 | 16.830 |
| 4 | 23 | −14.660 |
| 5 | 28 | 24.633 |

(Values for Conditional Expressions)

(1) f1/(−f2) = 6.21
(2) f3/f5 = 0.68
(3) (−f4)/f5 = 0.60
(4) f2/f4 = 0.72
(5) (−f2)/f5 = 0.43
(6) f1/f3 = 3.88
(7) f1/(−f4) = 4.45

FIGS. 22A and 22B are graphs showing various aberrations of the zoom lens system according to Example 5 in a wide-angle end state upon focusing on infinity, in which FIG. 22A shows various aberrations, and FIG. 22B shows coma upon vibration reduction with respect to a rotational camera shake of 0.2 degrees.

Figure 23A:
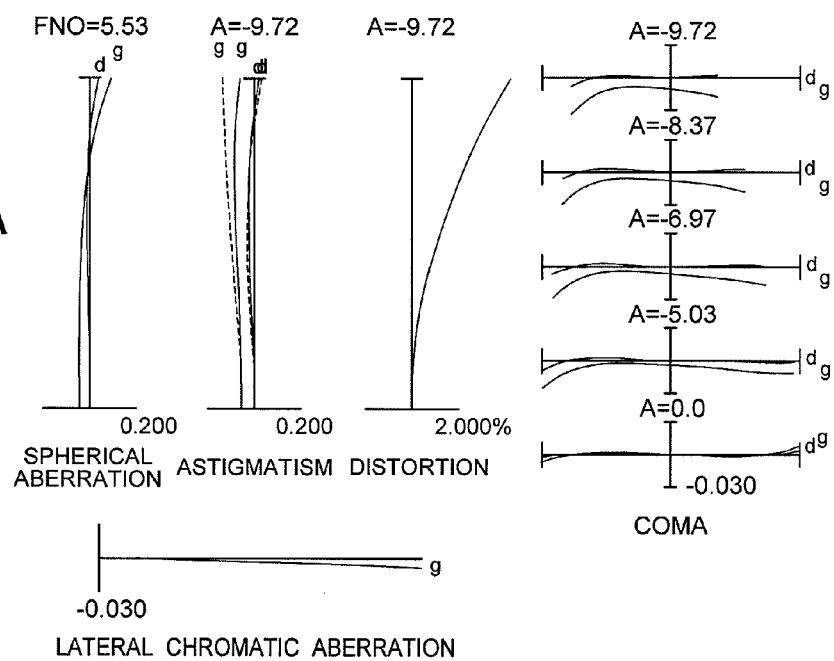
Figure 23B:
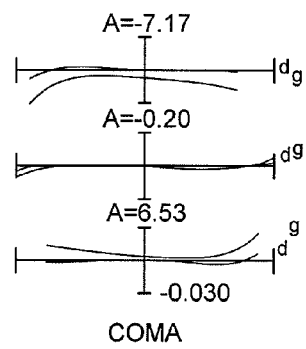

FIGS. 23A and 23B are graphs showing various aberrations of the zoom lens system according to Example 5 in an intermediate focal length state upon focusing on infinity, in which FIG. 23A shows various aberrations, and FIG. 23B shows coma upon vibration reduction with respect to a rotational camera shake of 0.2 degrees.

Figure 24A:
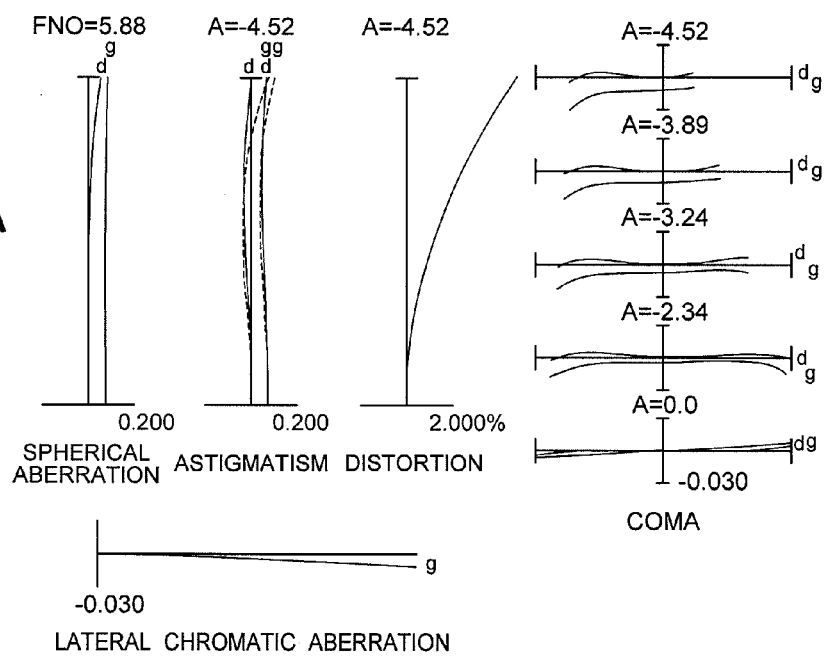
Figure 24B:
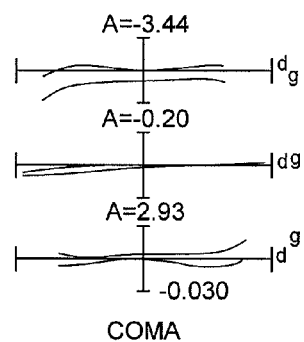

FIGS. 24A and 24B are graphs showing various aberrations of the zoom lens system according to Example 5 in a telephoto end state upon focusing on infinity, in which FIG. 24A shows various aberrations, and FIG. 24B shows coma upon vibration reduction with respect to a rotational camera shake of 0.2 degrees.

Figure 25A:
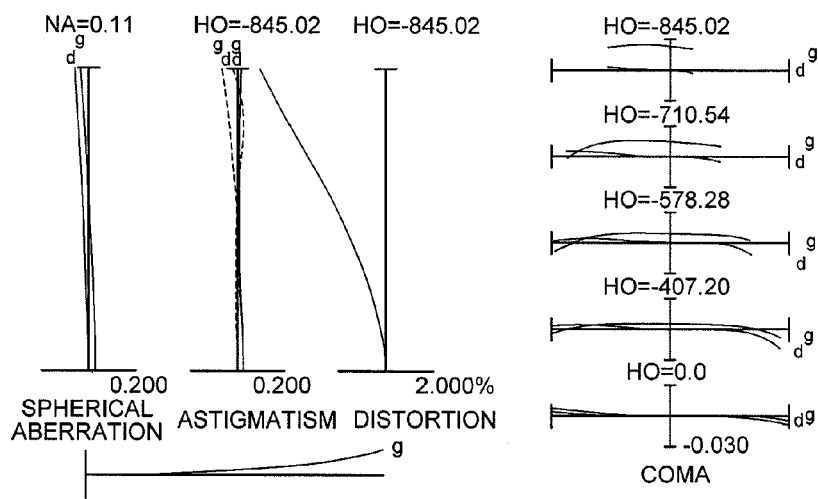
Figure 25B:
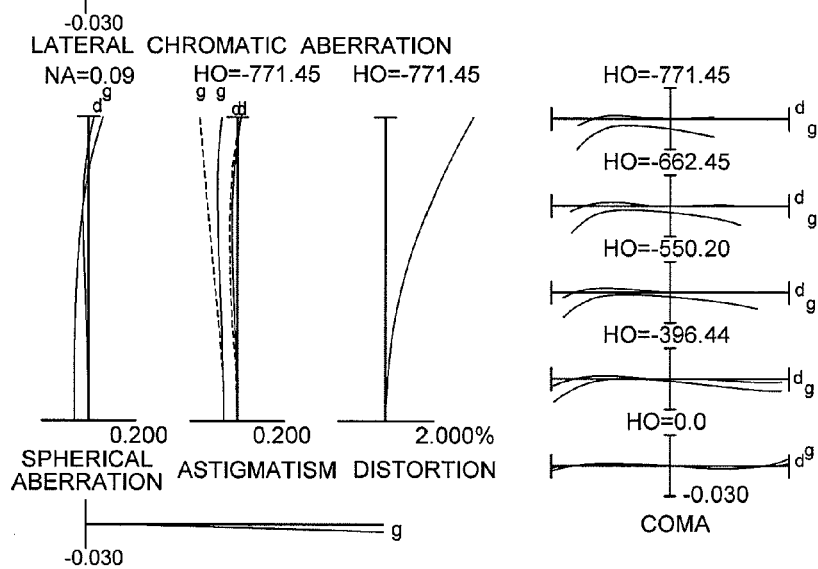
Figure 25C:
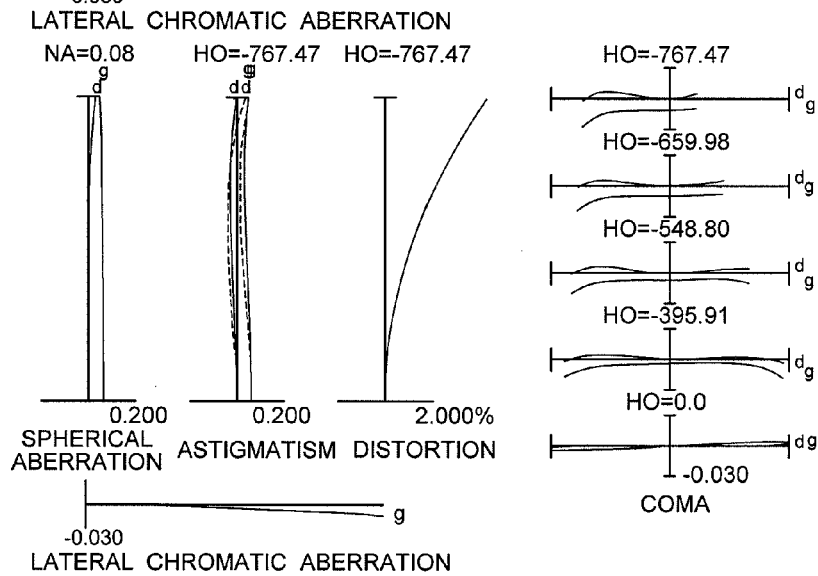

FIGS. 25A, 25B and 25C are graphs showing various aberrations of the zoom lens system according to Example 5 upon focusing on a close object, in which FIG. 25A is in the wide-angle end state, FIG. 25B is in the intermediate focal length state, and FIG. 25C is in the telephoto end state.

As is apparent from the respective graphs, the zoom lens system according to Example 5 shows superb optical performance as a result of good corrections to various aberrations in each focal length state from the wide-angle end state through the telephoto end state even upon carrying out vibration reduction.

Example 6

Figure 26:
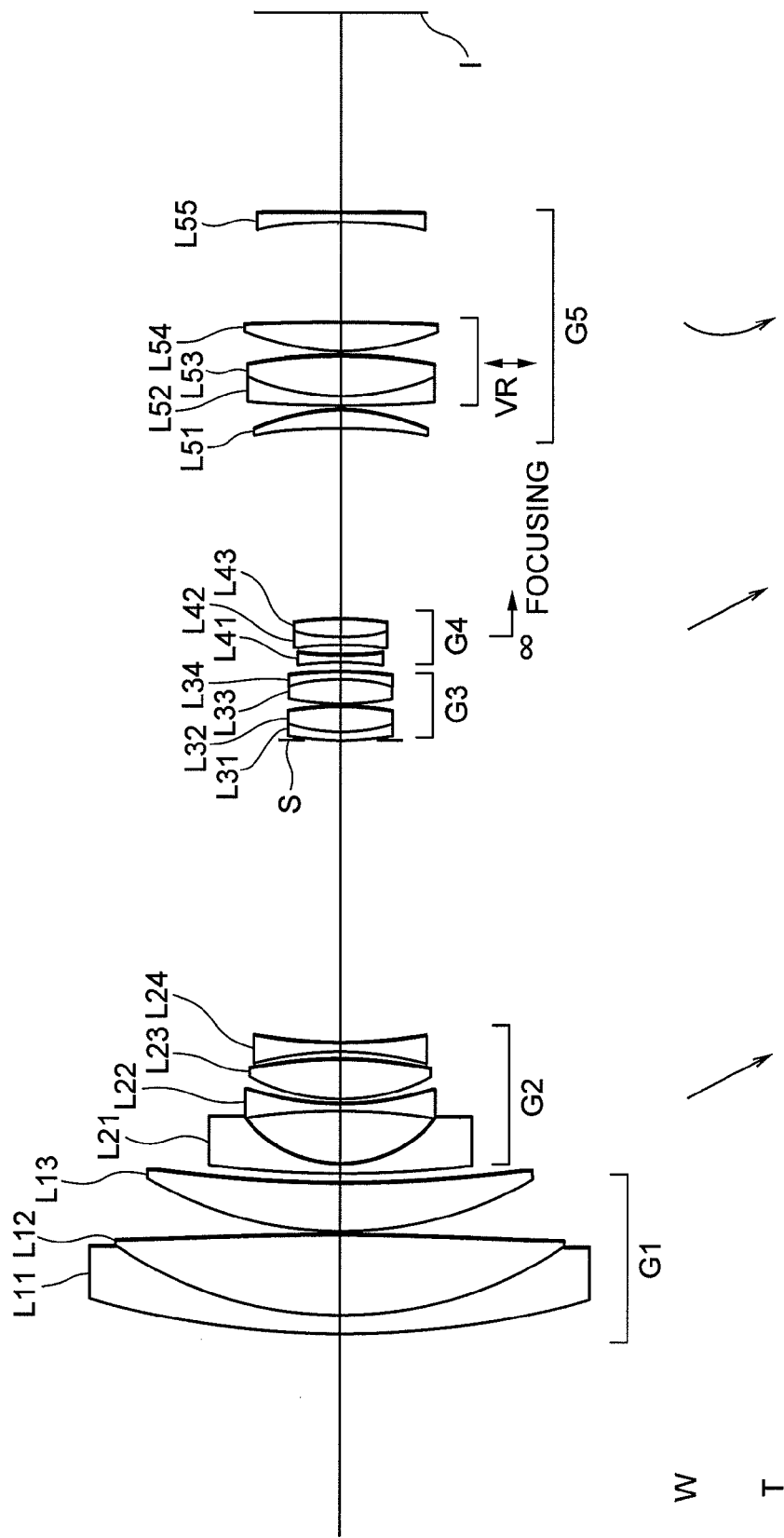
FIG. 26 is a sectional view showing a lens configuration of a zoom lens system according to Example 6 of the present application.

FIG. 26 is a sectional view showing a lens configuration of a zoom lens system according to Example 6 of the present application.

The zoom lens system according to Example 6 is composed of, in order from an object side, a first lens group G1 having positive refractive power, a second lens group G2 having negative refractive power, an aperture stop S, a third lens group G3 having positive refractive power, a fourth lens group G4 having negative refractive power, and a fifth lens group G5 having positive refractive power.

The first lens group G1 is composed of, in order from the object side, a cemented positive lens constructed by a negative meniscus lens L11 having a convex surface facing the object side cemented with a double convex positive lens L12, and a positive meniscus lens L13 having a convex surface facing the object side.

The second lens group G2 is composed of, in order from the object side, a negative meniscus lens L21 having a convex surface facing the object side, a double concave negative lens L22, a double convex positive lens L23, and a double concave negative lens L24.

The third lens group G3 is composed of, in order from the object side, a cemented positive lens constructed by a negative meniscus lens L31 having a convex surface facing the object side cemented with a double convex positive lens L32, and a cemented positive lens constructed by a double convex positive lens L33 cemented with a negative meniscus lens L34 having a concave surface facing the object side.

The fourth lens group G4 is composed of, in order from the object side, a double concave negative lens L41, and a cemented negative lens constructed by a double concave negative lens L42 cemented with a double convex positive lens L43.

The fifth lens group G5 is composed of, in order from the object side, a positive meniscus lens L51 having a concave surface facing the object side, a cemented positive lens constructed by a negative meniscus lens L52 having a convex surface facing the object side cemented with a double convex positive lens L53, a double convex positive lens L54, and a negative meniscus lens L55 having a concave surface facing the object side.

In the zoom lens system according to Example 6, upon zooming from an infinity object to a close object, the second lens group G2, the fourth lens group G4 and the fifth lens group G5 are moved along an optical axis such that a distance between the first lens group G1 and the second lens group G2 varies, a distance between the second lens group G2 and the third lens group G3 varies, a distance between the third lens group G3 and the fourth lens group G4 varies, and a distance between the fourth lens group G4 and the fifth lens group G5 varies. In this instance, positions of the first lens group G1, the third lens group G3 and the aperture stop S are fixed.

In the zoom lens system according to Example 6, the cemented positive lens constructed by the negative meniscus lens L52 cemented with the positive lens L53, and the double convex positive lens L54 in the fifth lens group G5 are moved as a vibration reduction lens group in a direction including a component perpendicular to the optical axis, thereby correcting an image blur.

In the zoom lens system according to Example 6, the whole of the fourth lens group G4 is moved to an image side, thereby carrying out focusing from an infinity object to a close object.

Various values associated with the zoom lens system according to Example 6 are listed in Table 6.

In the zoom lens system according to Example 6, in the wide-angle end state, the vibration reduction coefficient is 1.05, the focal length is 10.3 mm, so that in order to correct a rotational camera shake of 0.2 degrees, the moving amount of the vibration reduction lens group is 0.03 mm. In an intermediate focal length state, the vibration reduction coefficient is 0.99, the focal length is 45.0 mm, so that in order to correct a rotational camera shake of 0.2 degrees, the moving amount of the vibration reduction lens group is 0.16 mm. In the telephoto end state, the vibration reduction coefficient is 0.87, the focal length is 97.0 mm, so that in order to correct a rotational camera shake of 0.2 degrees, the moving amount of the vibration reduction lens group is 0.39 mm.

TABLE 6

(Specifications)
Zoom Ratio: 9.42

|  | W | M | T |
|---|---|---|---|
| f = | 10.3 | 45.0 | 97.0 |
| FNO = | 4.7 | 5.3 | 6.1 |
| 2ω = | 78.3 | 19.4 | 9.1 |
| Y = | 8.0 | 8.0 | 8.0 |
| TL = | 128.784 | 128.784 | 128.784 |
| Bf = | 19.429 | 17.659 | 14.429 |

(Lens Data)

| i | r | d | nd | νd |
|---|---|---|---|---|
| 1 | 93.1619 | 1.800 | 1.850260 | 32.35 |
| 2 | 39.5859 | 8.000 | 1.497820 | 82.51 |
| 3 | −284.0151 | 0.100 | | |
| 4 | 36.5540 | 5.000 | 1.729157 | 54.66 |
| 5 | 159.4459 | (d5) | | |
| *6 | 127.6881 | 1.000 | 1.816000 | 46.62 |
| 7 | 12.0348 | 5.060 | | |
| 8 | −49.9978 | 0.800 | 1.816000 | 46.62 |
| 9 | 29.2932 | 0.200 | | |
| 10 | 18.9882 | 4.000 | 1.846660 | 23.78 |
| 11 | −37.9737 | 0.471 | | |
| 12 | −28.9543 | 1.000 | 1.834807 | 42.72 |
| 13 | 48.3879 | (d13) | | |
| 14 | ∞ | 0.000 | Aperture Stop S | |
| 15 | 37.6996 | 0.800 | 1.834000 | 37.16 |
| 16 | 17.4219 | 2.500 | 1.593190 | 67.90 |
| 17 | −25.8437 | 0.100 | | |
| 18 | 20.8989 | 2.500 | 1.518601 | 69.97 |
| 19 | −16.6811 | 0.800 | 1.846660 | 23.78 |
| 20 | −31.8438 | (d20) | | |
| 21 | −36.4910 | 0.800 | 1.834807 | 42.72 |
| 22 | 29.3199 | 0.896 | | |
| 23 | −27.0631 | 0.800 | 1.834807 | 42.72 |
| 24 | 18.2268 | 1.800 | 1.846660 | 23.78 |
| 25 | −34.6409 | (d25) | | |
| 26 | −50.1069 | 2.000 | 1.497820 | 82.51 |
| 27 | −19.1363 | 0.200 | | |
| 28 | 96.2015 | 1.000 | 1.834807 | 42.72 |
| 29 | 23.1567 | 4.000 | 1.497820 | 82.51 |
| 30 | −46.1208 | 0.211 | | |
| 31 | 23.5512 | 3.000 | 1.497820 | 82.51 |
| 32 | −152.9275 | 9.791 | | |
| 33 | −37.8588 | 1.000 | 1.846660 | 23.78 |
| 34 | −283.7365 | BF | | |

(Aspherical Surface Data)

Surface Number: 6
κ = 8.8617
A4 = 1.80790E−07
A6 = −6.06139E−09
A8 = 4.62589E−11
A10 = −2.20120E−13

(Variable Distances upon Zooming)

|  | W | M | T |
|---|---|---|---|
| upon focusing on an infinity object | | | |
| d5 = | 0.800 | 20.665 | 28.181 |
| d13 = | 29.606 | 9.740 | 2.225 |
| d20 = | 0.800 | 9.620 | 15.486 |
| d25 = | 18.520 | 11.469 | 8.834 |
| Bf = | 19.429 | 17.659 | 14.429 |
| upon focusing on a close object | | | |
| d5 = | 0.800 | 20.665 | 28.181 |
| d13 = | 29.606 | 9.740 | 2.225 |
| d20 = | 0.855 | 9.821 | 15.897 |
| d25 = | 18.465 | 11.268 | 8.423 |
| Bf = | 19.429 | 17.659 | 14.429 |

TABLE 6-continued (Lens Group Data)

| Group | I | Focal Length |
|---|---|---|
| 1 | 1 | 57.030 |
| 2 | 6 | −10.449 |
| 3 | 15 | 16.471 |
| 4 | 21 | −18.248 |
| 5 | 26 | 28.038 |

(Values for Conditional Expressions)

(1) f1/(−f2) = 5.46
(2) f3/f5 = 0.59
(3) (−f4)/f5 = 0.65
(4) f2/f4 = 0.57
(5) (−f2)/f5 = 0.37
(6) f1/f3 = 3.46
(7) f1/(−f4) = 3.13

Figure 27A:
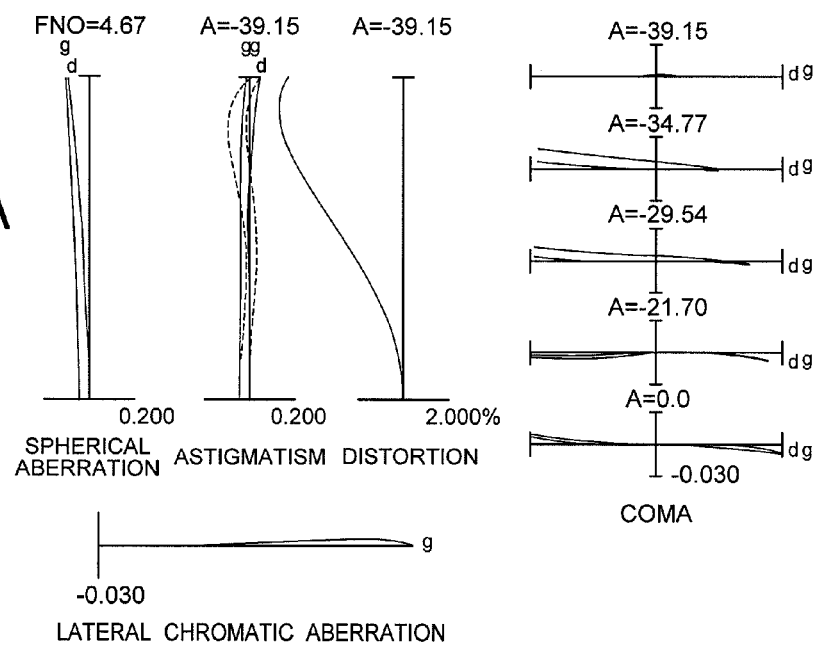
Figure 27B:
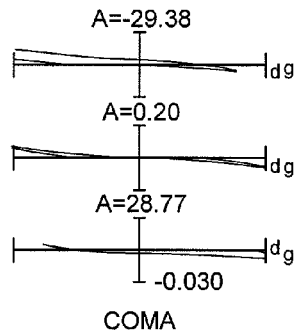

FIGS. 27A and 27B are graphs showing various aberrations of the zoom lens system according to Example 6 in a wide-angle end state upon focusing on infinity, in which FIG. 27A shows various aberrations, and FIG. 27B shows coma upon vibration reduction with respect to a rotational camera shake of 0.2 degrees.

Figure 28A:
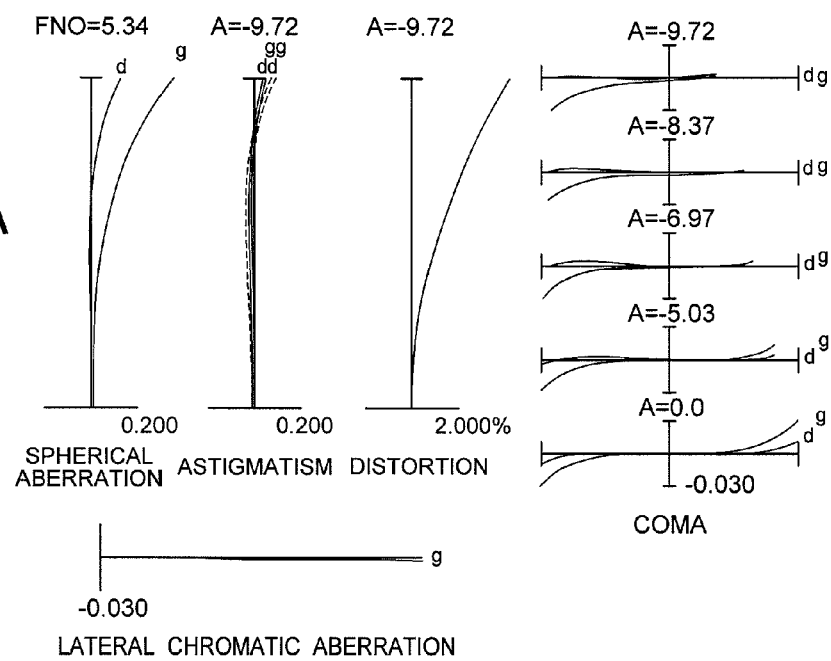
Figure 28B:
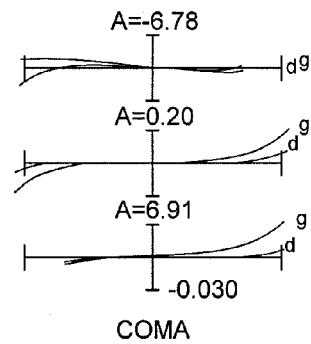

FIGS. 28A and 28B are graphs showing various aberrations of the zoom lens system according to Example 6 in an intermediate focal length state upon focusing on infinity, in which FIG. 28A shows various aberrations, and FIG. 28B shows coma upon vibration reduction with respect to a rotational camera shake of 0.2 degrees.

Figure 29A:
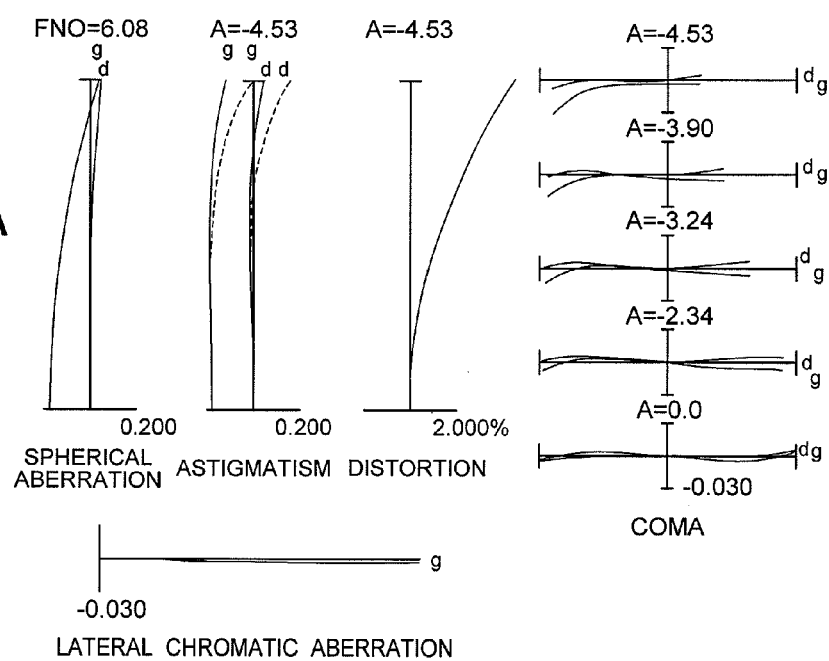
Figure 29B:
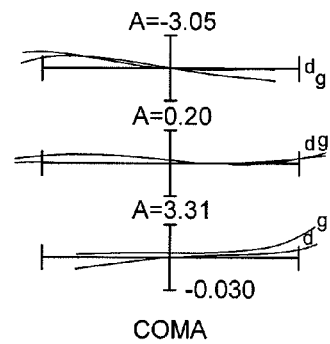

FIGS. 29A and 29B are graphs showing various aberrations of the zoom lens system according to Example 6 in a telephoto end state upon focusing on infinity, in which FIG. 29A shows various aberrations, and FIG. 29B shows coma upon vibration reduction with respect to a rotational camera shake of 0.2 degrees.

Figure 30A:
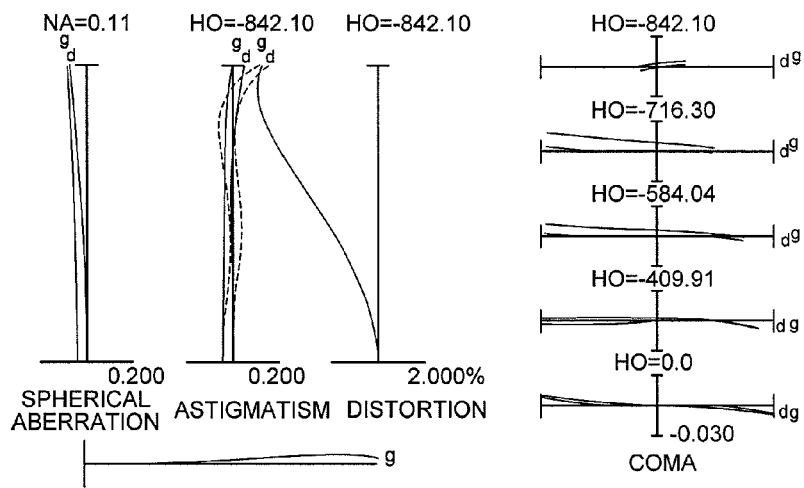
Figure 30B:
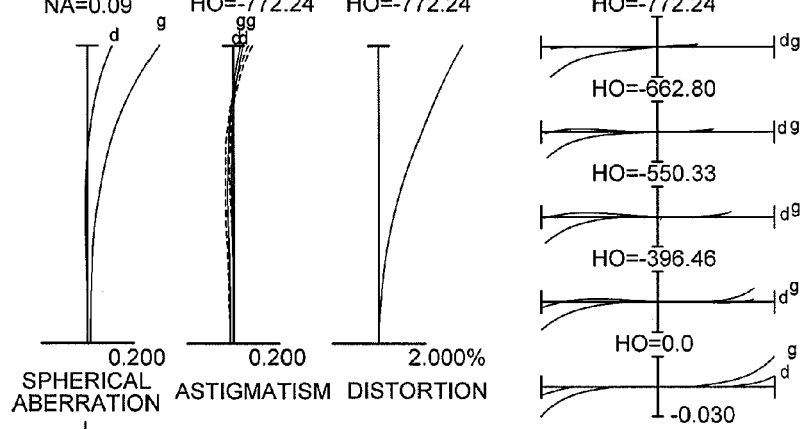
Figure 30C:
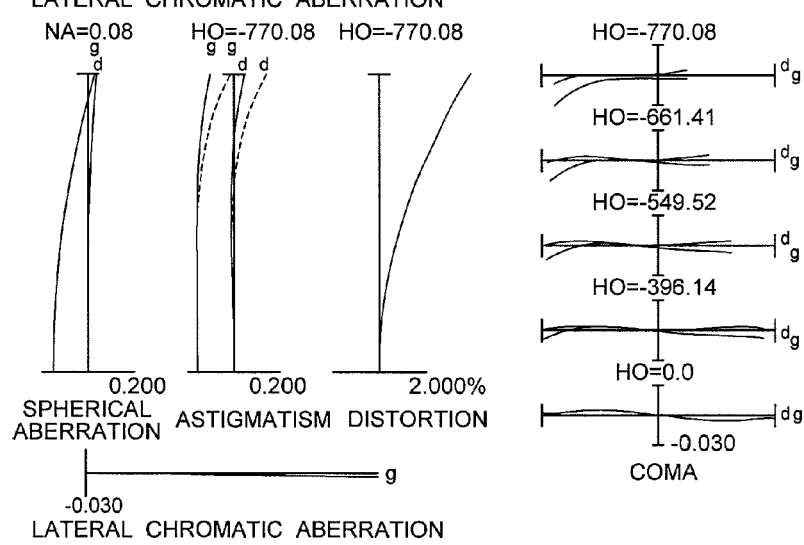

FIGS. 30A, 30B and 30C are graphs showing various aberrations of the zoom lens system according to Example 6 upon focusing on a close object, in which FIG. 30A is in the wide-angle end state, FIG. 30B is in the intermediate focal length state, and FIG. 30C is in the telephoto end state.

As is apparent from the respective graphs, the zoom lens system according to Example 6 shows superb optical performance as a result of good corrections to various aberrations in each focal length state from the wide-angle end state through the telephoto end state even upon carrying out vibration reduction.

According to each example, it becomes possible to realize a zoom lens system capable of excellently suppressing variation in aberrations upon zooming and variation in aberrations upon correcting an image blur.

Incidentally, in a zoom lens system according to each Example, the back focal length that is a distance along the optical axis between the image side lens surface of a lens disposed to the most image side of the lens system and the image plane is preferably from about 10.0 mm in the smallest state to 30.0 mm. In a zoom lens system according to each example, the image height is preferably 5.0 mm to 12.5 mm. It is most preferable that the image height is from 5.0 mm to 9.5 mm.

The present embodiment only shows a specific example for the purpose of better understanding of the present application. Accordingly, it is needless to say that the application in its broader aspect is not limited to the specific details and representative devices.

Incidentally, the following description may suitably be applied within limits that do not deteriorate optical performance of the zoom lens system.

In the above described Examples, although optical systems having a five-lens-group configuration has been shown, the present application is not limited to this, and the present application can be applied to other lens configurations such as a six-lens-group configuration and a seven-lens-group configuration. In particular, a lens configuration in which a lens or a lens group is added to the most object side, and a lens configuration in which a lens or a lens group is added to the most image side may be possible. Incidentally, a lens group is defined as a portion having at least one lens that is separated from the other portions by air spaces that vary upon zooming.

In a zoom lens system according to the present application, in order to vary focusing from an infinity object to a close object, a single lens group, a plurality of lens groups, or a sub-lens group may be moved as a focusing lens group along the optical axis. It is particularly preferable that at least a portion of the fourth lens group is used as the focusing lens group. In this case, the focusing lens group can be used for auto focus, and suitable for being driven by a motor such as an ultrasonic motor.

A lens group or a portion of a lens group may be moved in a direction having a component perpendicular to the optical axis, or swayed in a direction including an optical axis as a vibration reduction lens group, thereby correcting an image blur caused by a camera shake. It is particularly preferable in a zoom lens system according to the present application that at lest a portion of the third lens group is made to be a vibration reduction lens group.

Moreover, any lens surface composing a zoom lens system according to the present application may be formed as a spherical surface, a plane surface or an aspherical surface. When a lens surface is a spherical surface or a plane surface, processing and assembling become easy, so that deterioration of optical performance caused by errors upon processing and assembling can be prevented. Even if the image plane is shifted, deterioration in optical performance is small, so that it is desirable.

When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

In a zoom lens system according to the present application, although an aperture stop S is preferably disposed in the vicinity of the third lens group, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

The zoom ratio of the zoom lens system according to the preset application is about five to twenty.

In a zoom lens system according to the present application, it is preferable that the first lens group includes two positive lens components. The second lens group preferably includes one positive lens component and three negative lens components. The third lens group preferably includes three positive lens components. The fourth lens group preferably includes three positive lens components and one negative lens component.

Then, a camera equipped with a zoom lens system according to the present application is explained with reference to FIG. 31.

Figure 31:
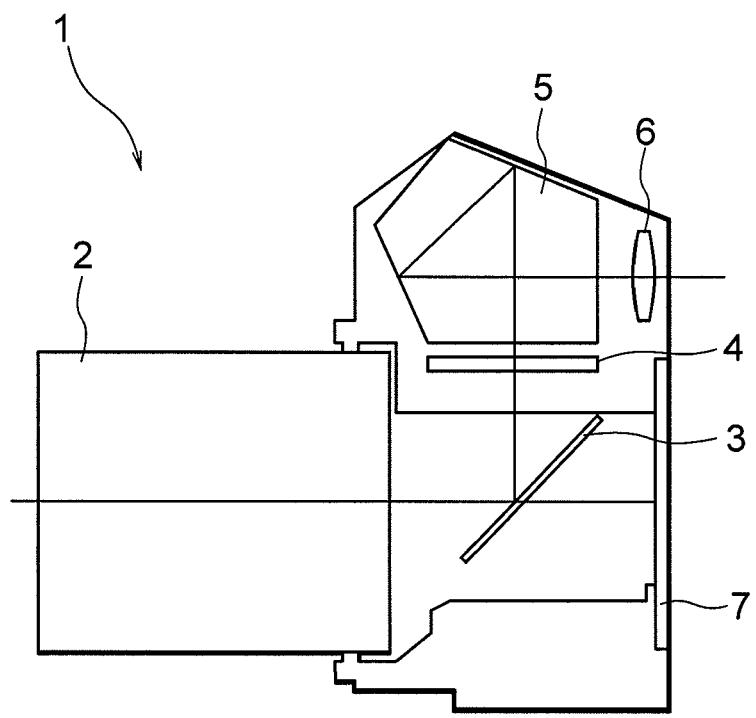
FIG. 31 is a sectional view showing a camera equipped with the zoom lens system according to the present application.

FIG. 31 is a sectional view showing a camera equipped with a zoom lens system according to the present application.

In FIG. 31, the camera 1 a single-lens reflex digital camera equipped with the zoom lens system according to Example 1 as an imaging lens 2.

In the camera 1, light coming out from an object (not shown) is converged by an imaging lens 2, reflected by a quick return mirror 3, and focused on a focusing screen 4. The light focused on the focusing screen 4 is reflected a plurality of times in a pentagonal roof prism 5, and led to an eyepiece 6. Accordingly, a photographer can observe the object image as an erected image through the eyepiece 6.

When the photographer presses a shutter-release button (not shown) all the way down, the quick return mirror 3 is retracted from the optical path, the light from the object forms an object image on an imaging device 7. Accordingly, the light from the object is captured by the imaging device 7, and a photographed image is stored in a memory (not shown). In this manner, the photographer can take an image of an object by the camera 1.

With the configuration described above, the camera 1 equipped with the zoom lens system according to Example 1 as an imaging lens 2 makes it possible to realize excellent optical performance with excellently suppressing variation in aberrations upon zooming and variation in aberrations upon correcting an image blur. Although a case that the zoom lens system according to Example 1 is installed in a camera is explained, the same goes in the cases installing the zoom lens system according to any one of Examples 2 through 6 as the imaging lens 2.

Then, an outline of a method for manufacturing a zoom lens system according to the present application is explained with reference to FIG. 32.

Figure 32:
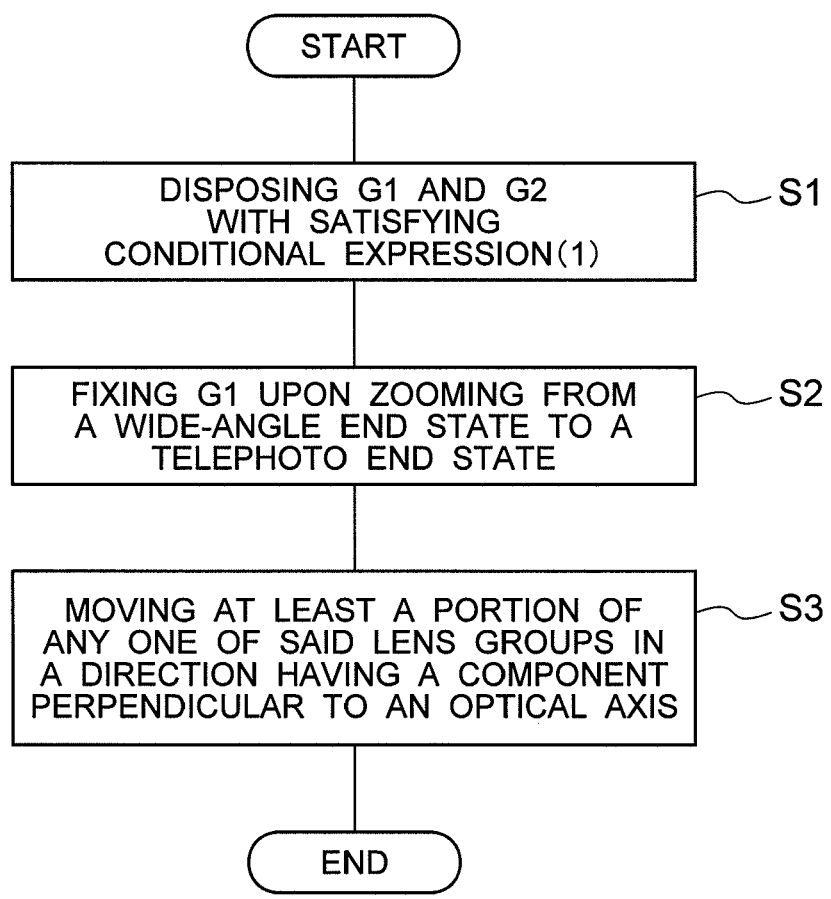
FIG. 32 is a flowchart schematically explaining a method for manufacturing the zoom lens system according to the present application.

FIG. 32 is a flowchart schematically explaining a method for manufacturing the zoom lens system according to the present application.

The method for manufacturing the zoom lens system according to the present application is a method for manufacturing a zoom lens system including, in order from an object side, a first lens group having positive refractive power, a second lens group having negative refractive power, a third lens group having positive refractive power, a fourth lens group having negative refractive power, and a fifth lens group having positive refractive power, the method including the following steps S1 through S3:

Step S1: disposing each lens group with satisfying conditional expression (1) into a lens barrel in order from the object side:

$$5.20 < f1/(-f2) < 8.00 \qquad (1)$$

where f1 denotes a focal length of the first lens group, and f2 denotes a focal length of the second lens group;

Step S2: varying a distance between the first lens group and the second lens group, a distance between the second lens group and the third lens group, a distance between the third lens group and the fourth lens group, and a distance between the fourth lens group and the fifth lens group upon zooming from a wide-angle end state to a telephoto end state by means of providing a well-known moving mechanism, and, in this instance, fixing the position of the first lens group; and Step S3: moving at least a portion of any one of lens groups in a direction including a component perpendicular to an optical axis by means of providing a well-known moving mechanism.

According to a method for manufacturing a zoom lens system according to the present application, it becomes possible to manufacture a zoom lens system capable of excellently suppressing variation in aberrations upon zooming and variation in aberrations upon vibration reduction.

Then, an outline of a method for manufacturing a zoom lens system seen from another point of view according to the present application is explained with reference to FIG. 33.

Figure 33:
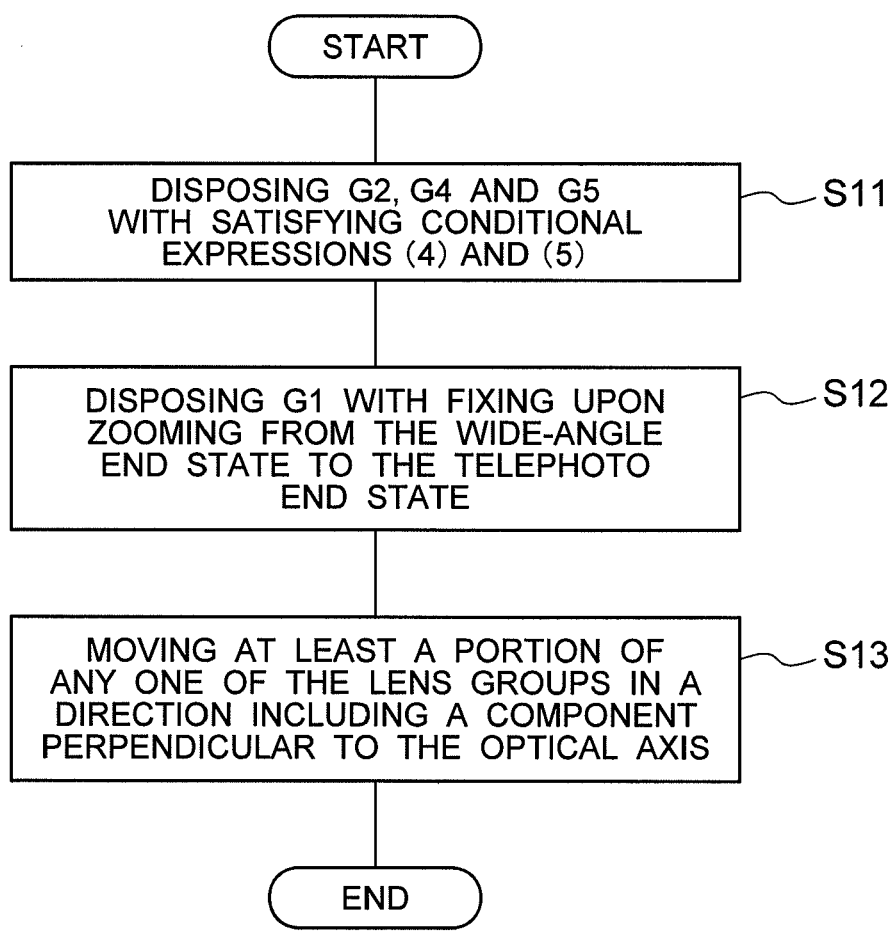
FIG. 33 is a flowchart schematically explaining a method for manufacturing the zoom lens system seen from another point of view according to the present application.

FIG. 33 is a flowchart schematically explaining a method for manufacturing the zoom lens system seen from another point of view according to the present application.

The method for manufacturing the zoom lens system seen from another point of view according to the present application is a method for manufacturing a zoom lens system including, in order from an object side, a first lens group having positive refractive power, a second lens group having negative refractive power, a third lens group having positive refractive power, a fourth lens group having negative refractive power, and a fifth lens group having positive refractive power, the method including the following steps S11 through S13:

Step S11: disposing the second lens group, the fourth lens group and the fifth lens group with satisfying conditional expressions (4) and (5) into a lens barrel in order from the object side:

$$0.44 < f2/f4 < 1.00 \qquad (4)$$

$$0.20 < (-f2)/f5 < 0.50 \qquad (5)$$

where f2 denotes a focal length of the second lens group, f4 denotes a focal length of the fourth lens group, and f5 denotes a focal length of the fifth lens group;

Step S12: varying a distance between the first lens group and the second lens group, a distance between the second lens group and the third lens group, a distance between the third lens group and the fourth lens group, and a distance between the fourth lens group and the fifth lens group upon zooming from a wide-angle end state to a telephoto end state by means of providing a well-known moving mechanism, and, in this instance, fixing the position of the first lens group; and Step S13: moving at least a portion of any one of lens groups in a direction including a component perpendicular to an optical axis by means of providing a well-known moving mechanism.

According to a method for manufacturing a zoom lens system seen from another point of view according to the present application, it becomes possible to manufacture a zoom lens system capable of excellently suppressing variation in aberrations upon zooming.

What is claimed is:

1. A zoom lens system comprising, in order from an object side:
   a first lens group having positive refractive power;
   a second lens group having negative refractive power;
   a third lens group having positive refractive power;
   a fourth lens group having negative refractive power; and
   a fifth lens group having positive refractive power,
   upon zooming from a wide-angle end state to a telephoto end state, a position of the first lens group being fixed,
   at least a portion of any one of the lens groups being movable in a direction including a component perpendicular to an optical axis, and
   the following conditional expressions being satisfied:

$$5.20 < f1/(-f2) < 8.00$$

$$0.50 < f2/f4 < 0.85$$

where f1 denotes a focal length of the first lens group, f2 denotes a focal length of the second lens group, and f4 denotes a focal length of the fourth lens group.

2. The zoom lens system according to claim 1, wherein at least a portion of the third lens group is movable in a direction including a component perpendicular to the optical axis.

3. The zoom lens system according to claim 1, wherein the following conditional expression is satisfied:

$$0.20 < f3/f5 < 0.80$$

where f3 denotes a focal length of the third lens group, and f5 denotes a focal length of the fifth lens group.

4. The zoom lens system according to claim 1, wherein the fourth lens group is moved upon carrying out focusing from an infinity object to a close object.

5. The zoom lens system according to claim 1, wherein the following conditional expression is satisfied:

$$0.20 < (-f4)/f5 < 0.90$$

where f4 denotes the focal length of the fourth lens group, and f5 denotes a focal length of the fifth lens group.

6. The zoom lens system according to claim 1, wherein a position of the third lens group is fixed upon zooming from the wide-angle end state to the telephoto end state.

7. The zoom lens system according to claim 1, wherein distances between adjacent lens groups are varied upon zooming from the wide-angle end state to the telephoto end state.

8. The zoom lens system according to claim 1, wherein an aperture stop is disposed between the second lens group and the fourth lens group.

9. A zoom lens system comprising, in order from an object side:
a first lens group having positive refractive power;
a second lens group having negative refractive power;
a third lens group having positive refractive power;
a fourth lens group having negative refractive power; and
a fifth lens group having positive refractive power,
upon zooming from a wide-angle end state to a telephoto end state, a position of the first lens group being fixed,
at least a portion of any one of the lens groups being movable in a direction including a component perpendicular to an optical axis, and
the following conditional expressions being satisfied:

$$0.44 < f2/f4 < 1.00$$

$$0.20 < (-f2)/f5 < 0.50$$

where f2 denotes a focal length of the second lens group, f4 denotes a focal length of the fourth lens group, and f5 denotes a focal length of the fifth lens group.

10. The zoom lens system according to claim 1, wherein the following conditional expression is satisfied:

$$0.20 < (-f2)/f5 < 0.50$$

where f2 denotes the focal length of the second lens group, and f5 denotes a focal length of the fifth lens group.

11. The zoom lens system according to claim 1, wherein the following conditional expression is satisfied:

$$3.00 < f1/f3 < 5.00$$

where f1 denotes the focal length of the first lens group, and f3 denotes a focal length of the third lens group.

12. The zoom lens system according to claim 1, wherein the following conditional expression is satisfied:

$$2.00 < f1/(-f4) < 5.00$$

where f1 denotes the focal length of the first lens group, and f4 denotes the focal length of the fourth lens group.

13. An optical apparatus equipped with the zoom lens system according to claim 1.

14. The zoom lens system according to claim 9, wherein the following conditional expression is satisfied:

$$0.50 < f2/f4 < 0.85$$

where f2 denotes the focal length of the second lens group, and f4 denotes the focal length of the fourth lens group.

15. The zoom lens system according to claim 9, wherein the following conditional expression is satisfied:

$$3.00 < f1/f3 < 5.00$$

where f1 denotes a focal length of the first lens group, and f3 denotes a focal length of the third lens group.

16. The zoom lens system according to claim 9, wherein the following conditional expression is satisfied:

$$2.00 < f1/(-f4) < 5.00$$

where f1 denotes a focal length of the first lens group, and f4 denotes the focal length of the fourth lens group.

17. An optical apparatus equipped with the zoom lens system according to claim 9.

18. A method for manufacturing a zoom lens system including, in order from an object side, a first lens group having positive refractive power, a second lens group having negative refractive power, a third lens group having positive refractive power, a fourth lens group having negative refractive power, and a fifth lens group having positive refractive power, the method comprising steps of:
disposing the first lens group, the second lens group, and the fourth lens group with the following conditional expressions being satisfied:

$$5.20 < f1/(-f2) < 8.00$$

$$0.50 < f2/f4 < 0.85$$

where f1 denotes a focal length of the first lens group, f2 denotes a focal length of the second lens group, and f4 denotes a focal length of the fourth lens group;
the first lens group further being disposed so as to be fixed upon zooming from a wide-angle end state to a telephoto end state; and
at least a portion of any one of the lens groups being disposed so as to be movable in a direction including a component perpendicular to an optical axis.

19. The method according to claim 18, wherein
at least a portion of the third lens group is movable in the direction including a component perpendicular to the optical axis.

20. The method according to claim 18, further comprising a step of:
satisfying the following conditional expression:

$$0.20 < f3/f5 < 0.80$$

where f3 denotes a focal length of the third lens group, and f5 denotes a focal length of the fifth lens group.

21. The method according to claim 18, further comprising a step of:
satisfying the following conditional expression:

$$0.20 < (-f4)/f5 < 0.90$$

where f4 denotes the focal length of the fourth lens group, and f5 denotes a focal length of the fifth lens group.

22. A method for manufacturing a zoom lens system including, in order from an object side, a first lens group having positive refractive power, a second lens group having negative refractive power, a third lens group having positive refractive power, a fourth lens group having negative refractive power, and a fifth lens group having positive refractive power, the method comprising steps of:

disposing the second lens group, the fourth lens group and the fifth lens group with the following conditional expressions being satisfied:

$$0.44 < f2/f4 < 1.00$$

$$0.20 < (-f2)/f5 < 0.50$$

where f2 denotes a focal length of the second lens group, f4 denotes a focal length of the fourth lens group, and f5 denotes a focal length of the fifth lens group;

disposing the first lens group so as to be fixed upon zooming from a wide-angle end state to a telephoto end state; and disposing at least a portion of any one of the lens groups so as to be moveable in a direction including a component perpendicular to an optical axis.

23. The method according to claim 22, further comprising a step of:

satisfying the following conditional expression:

$$3.00 < f1/f3 < 5.00$$

where f1 denotes a focal length of the first lens group, and f3 denotes a focal length of the third lens group.

24. The method according to claim 22, further comprising a step of:

satisfying the following conditional expression:

$$2.00 < f1/(-f4) < 5.00$$

where f1 denotes a focal length of the first lens group, and f4 denotes the focal length of the fourth lens group.

25. A zoom lens system comprising, in order from an object side:

a first lens group having positive refractive power;
a second lens group having negative refractive power;
a third lens group having positive refractive power;
a fourth lens group having negative refractive power; and
a fifth lens group having positive refractive power,
upon zooming from a wide-angle end state to a telephoto end state, a position of the first lens group being fixed,
upon zooming from the wide-angle end state to the telephoto end state, a position of the third lens group being fixed,
at least a portion of any one of the lens groups being movable in a direction including a component perpendicular to an optical axis, and
the following conditional expression being satisfied:

$$5.20 < f1/(-f2) < 8.00$$

where f1 denotes a focal length of the first lens group, and f2 denotes a focal length of the second lens group.

* * * * *